(12) United States Patent
Hoshen et al.

(10) Patent No.: US 12,182,721 B2
(45) Date of Patent: Dec. 31, 2024

(54) DEEP LEARNING-BASED ANOMALY DETECTION IN IMAGES

(71) Applicant: YISSUM RESEARCH DEVELOPMENT COMPANY OF THE HEBREW UNIVERSITY OF JERUSALEM LTD., Jerusalem (IL)

(72) Inventors: Yedid Hoshen, Jerusalem (IL); Liron Bergman, Jerusalem (IL); Niv Cohen, Raanana (IL); Tal Reiss, Netanya (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 337 days.

(21) Appl. No.: 17/913,905

(22) PCT Filed: Mar. 25, 2021

(86) PCT No.: PCT/IL2021/050339
§ 371 (c)(1),
(2) Date: Sep. 23, 2022

(87) PCT Pub. No.: WO2021/191908
PCT Pub. Date: Sep. 30, 2021

(65) Prior Publication Data
US 2023/0281959 A1    Sep. 7, 2023

Related U.S. Application Data

(60) Provisional application No. 62/994,694, filed on Mar. 25, 2020.

(51) Int. Cl.
*G06V 10/00*        (2022.01)
*G06N 3/088*        (2023.01)
(Continued)

(52) U.S. Cl.
CPC ............ *G06N 3/088* (2013.01); *G06V 10/44* (2022.01); *G06V 10/761* (2022.01); *G06V 10/762* (2022.01); *G06V 10/82* (2022.01)

(58) Field of Classification Search
CPC ............ G06N 3/088; G06N 3/08; G06N 3/02; G06N 3/042; G06N 3/045; G06N 3/047;
(Continued)

(56) References Cited

U.S. PATENT DOCUMENTS

| 8,103,090 | B2 * | 1/2012 | Ma | ........................ | G06V 10/764 348/169 |
| 8,861,884 | B1 * | 10/2014 | Fang | ................... | G06F 18/2413 382/255 |

(Continued)

OTHER PUBLICATIONS

Iron Bergman et al, "Deep Nearest Neighbor Anomaly Detection"; Online at: https://arxiv.org/pdf/2002.10445.pdf, Feb. 24, 2020.
(Continued)

*Primary Examiner* — Amir Alavi
(74) *Attorney, Agent, or Firm* — The Roy Gross Law Firm, LLC; Roy Gross

(57) ABSTRACT

A method comprising: receiving, as input, training images, wherein at least a majority of the training images represent normal data instances; receiving, as input, a target image; extracting (i) a set of feature representations from a plurality of image locations within each of the training images, and (ii) target feature representations from a plurality of target image locations within the target image; calculating, with respect to a target image location of the plurality of target image locations in the target image, a distance between (iii) the target feature representation of the target image location, and (iv) a subset from the set of feature representations comprising the k nearest the feature representations to the target feature representation; and determining that the target
(Continued)

image location is anomalous, when the calculated distance exceeds a predetermined threshold.

20 Claims, 20 Drawing Sheets

(51) Int. Cl.
*G06V 10/44* (2022.01)
*G06V 10/74* (2022.01)
*G06V 10/762* (2022.01)
*G06V 10/82* (2022.01)

(58) Field of Classification Search
CPC ........ G06N 3/049; G06N 3/082; G06N 3/092; G06N 3/0475; G06N 3/0454; G06N 3/0464; G06V 10/762; G06V 10/761; G06V 10/82; G06V 10/44; G06F 18/24147; G06F 18/2433
See application file for complete search history.

(56) References Cited

U.S. PATENT DOCUMENTS

| | | | | |
|---|---|---|---|---|
| 9,158,971 | B2* | 10/2015 | Gaidon | G06V 20/40 |
| 9,760,690 | B1* | 9/2017 | Petkov | G06T 15/08 |
| 10,043,088 | B2* | 8/2018 | Odry | G06V 30/19173 |
| 10,489,126 | B2* | 11/2019 | Kumar | G06V 30/422 |
| 10,593,039 | B2* | 3/2020 | Jalali | G16B 40/20 |
| 10,728,553 | B2* | 7/2020 | Xu | H04N 19/124 |
| 11,227,186 | B2* | 1/2022 | Zhang | G06F 18/214 |
| 11,301,719 | B2* | 4/2022 | Zhan | G06F 18/214 |
| 2007/0183686 | A1* | 8/2007 | Ioffe | G06V 40/165 |
| | | | | 382/159 |
| 2017/0032285 | A1 | 2/2017 | Sharma et al. | |
| 2019/0244513 | A1 | 8/2019 | Niculescu-Mizil et al. | |
| 2020/0070352 | A1 | 3/2020 | Larzaro-Gredilla et al. | |
| 2023/0281959 | A1* | 9/2023 | Hoshen | G06N 3/045 |
| | | | | 382/225 |

OTHER PUBLICATIONS

Mohammad Sabokrou et al, "Deep-cascade: Cascading 3D Deep Neural Networks for Fast Anomaly Detection and Localization in Crowded Scenes"; IEEE Transactions on Image Processing, vol. 26, No. 4, Apr. 1, 2017.
Lucas Deecke et al., "Anomaly detection with generative adversarial networks"; conference paper at ICLR 2018, Feb. 15, 2018.
Eleazar Eskin et al, "A geometric framework for unsupervised anomaly detection"; In Applications of data mining in computer security, pp. 77-101. Springer, 2002.
Spyros Gidaris et al, "Unsupervised representation learning by predicting image rotations"; ICLR, Online at: arXiv:1803.07728, Mar. 21, 2018.
Izhak Golan et al, "Deep anomaly detection using geometric transformations"; In NeurIPS, Online at: arxiv.org/pdf/1805.10917, Nov. 9, 2018.
Dan Hendrycks et al, "Deep anomaly detection with outlier exposure"; arXiv preprint Online at: arXiv:1812.04606, Jan. 28, 2019.
Gustav Larsson et al, "Learning representations for automatic colorization"; In ECCV, 2016. Online at: https://arxiv.org/pdf/1603.06668, Aug. 13, 2017.
Aleksander Madry et al, "Towards deep learning models resistant to adversarial attacks"; arXiv preprint, Online at: arXiv:1706.06083, Sep. 4, 2019.
Michael Mathieu et al, "Deep multi-scale video prediction beyond mean square error"; ICLR, Online at: https://arxiv.org.pdf/1511.05440, Feb. 26, 2016.
Mehdi Noroozi et al, "Unsupervised learning of visual representations by solving jigsaw puzzles"; In ECCV, 2016. Online at: https://arxiv.org/pdf/1603.09246, Aug. 22, 2017.
Lukas Ruff et al, "Deep one-class classification"; Proceedings of the 35th International Conference on Machine Learning, PMLR 80:4393-4402, Jan. 1, 2018.
Mayu Sakurada et al, "Anomaly detection using autoencoders with nonlinear dimensionality reduction"; In MLSD. ACM, Dec. 2014.
Thomas Schlegl et al, "Unsupervised anomaly detection with generative adversarial networks to guide marker discovery"; In International Conference on Information Processing in Medical Imaging, Mar. 17, 2017.
Bernhard Scholkopf et al, "Support vector method for novelty detection"; In NIPS, Nov. 29-Dec. 4, 1999.
Yan Xia et al, "Learning discriminative reconstructions for unsupervised outlier removal"; In ECCV, Dec. 7, 2015.
Bo Yang et al, "Towards k-means-friendly spaces: Simultaneous deep learning and clustering"; In ICML, 70:3861-3870, Jun. 13, 2017.
Richard Zhang et al, "Colorful image colorization" In ECCV, Online at: https://arxiv.org/pdf/1603.08511, Oct. 5, 2016.
Bo Zong et al, "Deep autoencoding gaussian mixture model for unsupervised anomaly detection"; ICLR, Feb. 15, 2018.
Tomas Pevny, "Loda: Lightweight on-line detector of anomalies"; Machine Learning 102(2), Jul. 21, 2015.
International search report for PCT/IL2021/050339 dated Jun. 25, 2021.
Written opinion for PCT/IL2021/050339 dated Jun. 25, 2021.

* cited by examiner

B

A

D

C

A

B

C

D

DEEP LEARNING-BASED ANOMALY DETECTION IN IMAGES

CROSS-REFERENCE TO RELATED APPLICATIONS

This application is a National Phase of PCT Patent Application No. PCT/IL2021/050339 having an International filing date of Mar. 25, 2021, which claims the benefit of priority from U.S. Provisional Patent Application No. 62/994,694, filed Mar. 25, 2020, the contents of which are all incorporated by reference as if fully set forth herein in their entirety.

FIELD OF THE INVENTION

The invention relates to the field of machine learning.

BACKGROUND

Agents interacting with the world are constantly exposed to a continuous stream of data. Agents can benefit from classifying particular data as anomalous, i.e., particularly interesting or unexpected. Such discrimination is helpful in allocating attention to the observations that warrant particular scrutiny. Anomaly detection by artificial intelligence has many important applications, such as fraud detection, cyber intrusion detection, and predictive maintenance of critical industrial equipment.

In machine learning, the task of anomaly detection consists of learning a classifier that can label a data point as normal or anomalous. In supervised classification, methods attempt to perform well on normal data, whereas anomalous data is considered noise. The goal of anomaly detection methods is to specifically detect extreme cases, which are highly variable and hard to predict. This makes the task of anomaly detection challenging (and often poorly specified).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instruction, the program instructions executable by the at least one hardware processor to: receive, as input, training images, wherein at least a majority of the training images represent normal data instances, receive, as input, a target image, extract (i) a set of feature representations from a plurality of image locations within each of the training images, and (ii) target feature representations from a plurality of target image locations within the target image, calculate, with respect to a target image location of the plurality of target image locations in the target image, a distance between (iii) the target feature representation of the target image location, and (iv) a subset from the set of feature representations comprising the k nearest the feature representations to the target feature representation, and determine that the target image location is anomalous, when the calculated distance exceeds a predetermined threshold.

There is also provided, in an embodiment, a computer-implemented method comprising: receiving, as input, training images, wherein at least a majority of the training images represent normal data instances; receiving, as input, a target image; extracting (i) a set of feature representations from a plurality of image locations within each of the training images, and (ii) target feature representations from a plurality of target image locations within the target image; calculating, with respect to a target image location of the plurality of target image locations in the target image, a distance between (iii) the target feature representation of the target image location, and (iv) a subset from the set of feature representations comprising the k nearest the feature representations to the target feature representation; and determining that the target image location is anomalous, when the calculated distance exceeds a predetermined threshold.

There is further provided, in an embodiment, a computer program product comprising a non-transitory computer-readable storage medium having program instructions embodied therewith, the program instructions executable by at least one hardware processor to comprising: receive, as input, training images, wherein at least a majority of the training images represent normal data instances; receive, as input, a target image; extract (i) a set of feature representations from a plurality of image locations within each of the training images, and (ii) target feature representations from a plurality of target image locations within the target image; calculate, with respect to a target image location of the plurality of target image locations in the target image, a distance between (iii) the target feature representation of the target image location, and (iv) a subset from the set of feature representations comprising the k nearest the feature representations to the target feature representation; and determine that the target image location is anomalous, when the calculated distance exceeds a predetermined threshold.

In some embodiments, the program instructions are further executable to perform, and the method further comprises performing, the calculating and the determining with respect to all of the plurality of target image locations.

In some embodiments, the program instructions are further executable to designate, and the method further comprises designating, a segment of the target image as comprising anomalous target image locations, based, at least in part, on the determining.

In some embodiments, the program instructions are further executable to apply, and the method further comprises applying, a clustering algorithm to the set of feature representations, to obtain clusters of the feature representations, wherein the calculating comprises calculating, with respect to a target image location of the plurality of target image locations, a distance between (i) the target feature representation of the target image location, and (ii) the k nearest means of the clusters to the target feature representation.

In some embodiments, the extracting is performed by applying a trained machine learning model to the training images and the target image, wherein the machine learning model is trained on a provided dataset of images.

In some embodiments, the trained machine learning model undergoes additional training using the training images.

In some embodiments, the trained machine learning model comprises a deep-learning neural network architecture comprising a plurality of layers, and wherein the extracting comprises concatenating features from two or more layers of the plurality of layers.

In some embodiments, the extracting comprises extracting the feature representations separately from each of two or more layers of the machine learning model; the calculating comprises calculating a distance separately with respect to the feature representations extracted from each of the two or more layers; and the determining is based on a summation of all of the distance calculations.

In some embodiments, the two or more layers include the uppermost M layers of the plurality of layers.

In some embodiments, the extracting is performed by applying a trained machine learning model to the training images and the target image, wherein the trained machine learning model comprises a self-attention architecture comprising vision transformers.

In some embodiments, the calculating comprises: selecting, from the training images, a specified number n of nearest images to the target image; and calculating, with respect to a target image location of the plurality of target image locations in the target image, a distance between (a) the target feature representation of the target image location, and (b) the feature representations from all of the image locations in the n nearest images; and determining that the target image location is anomalous, when the calculated distance exceeds a predetermined threshold.

In some embodiments, the feature representation encodes high spatial resolution and semantic context.

In some embodiments, each of the image locations represents a pixel in (i) each of the training images, and (ii) the target image.

In some embodiments, the extracting is performed with respect to all image locations in (i) each of the training images, and (ii) the target image.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
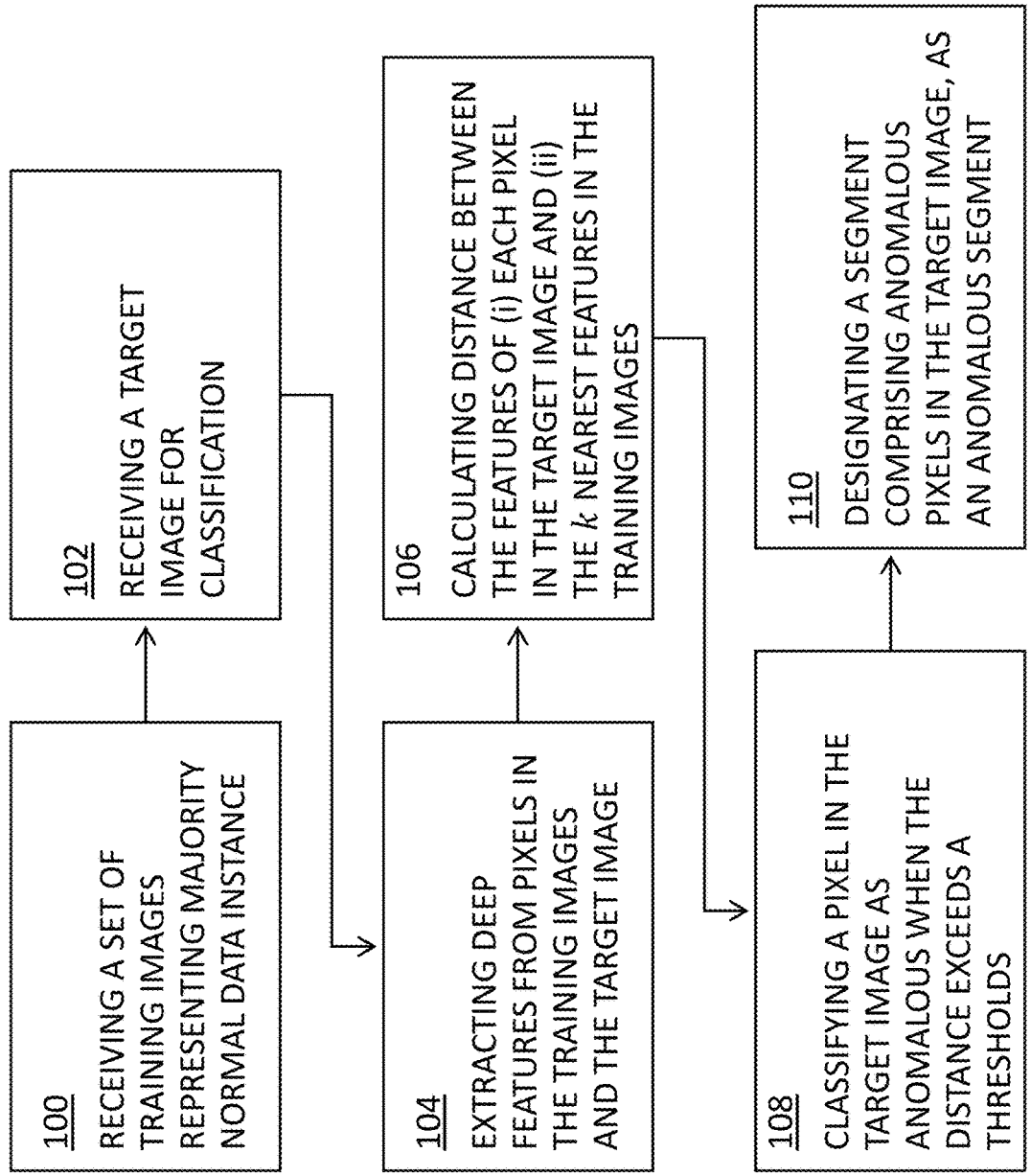
FIG. 1 is a flowchart of the functional steps in a process of the present disclosure for automated detection of anomalous patterns in images, according to some embodiments of the present disclosure.

Disclosed herein are a system, method, and computer program product for automated detection of anomalous patterns in images.

In some embodiments, the present disclosure provides for a machine learning model which uses deep-learning techniques to extract feature embeddings from a training image dataset. In some embodiments, the present machine learning model then applies one or more distribution-based approaches (e.g., nearest-neighbors approaches), to calculate a distance between features extracted from a target image and the embeddings of the training dataset learned during training, wherein the present model may designate the target image as anomalous when the calculated distance exceeds a specified threshold.

In some embodiments, a machine learning model of the present disclosure may be trained in a semi-supervised manner, wherein the training dataset may be assumed to only include normal data instances. In some embodiments, a machine learning model of the present disclosure may be trained in an unsupervised manner, wherein the training dataset may be assumed to include a small proportion of anomalous data instances.

In some embodiments, a machine learning model of the present disclosure may be trained to perform group image anomaly detection, wherein an input data sample consists of a set of images, and wherein each image in the set may be individually normal, but the set as a whole may be anomalous. In some embodiments, the present disclosure provides for deep-learning group-level feature embedding, based on orderless pooling over all the features of the images in a set. In some embodiments, the extracted group level features may then be classified as normal or anomalous based on, e.g., nearest-neighbors approaches.

In some embodiments, the present disclosure provides for a pre-trained deep-learning model which extracts features from a provided dataset of images of general availability, wherein the training dataset may not be directly related to the anomaly detection task. Accordingly, in some embodiments, a pre-trained feature extracting model may be trained on a provided dataset, e.g., using self-supervised techniques. In some embodiments, the features extracted using the pre-trained model may undergo a feature adaptation stage, wherein the general pre-trained extracted features are adapted to the task of anomaly detection on the target distribution by, e.g., fine-tuning the pre-trained model with a compactness loss and/or using continual learning adaptive regularization.

In some embodiments, the present disclosure provides for sub-image anomaly detection, wherein a segmentation map may be provided which describes a segment where an anomaly is present inside an image. In some embodiments, the present disclosure provides for a novel anomaly segmentation approach based on alignment between a target image and a specified number of nearest normal images. In some embodiments, the present disclosure provides for determining correspondences between the target image and the nearest images based on a multi-resolution feature pyramid.

Accordingly, in some embodiments, the present disclosure provides for a machine learning model which uses deep-learning techniques to extract feature embeddings from a training image dataset. In some embodiments, the present machine learning model then applies one or more distribution-based approaches (e.g., nearest-neighbors approaches), to calculate a distance between features extracted from a target image and the embeddings of the training dataset learned during training, wherein the present model may designate the target image as anomalous when the calculated distance exceeds a specified threshold.

In some embodiments, a target image classified as anomalous may undergo sub-image anomaly detection, wherein a specified number of nearest normal images may be selected from the training dataset, based on a distance between the target image and the selected nearest images which may be measured using any suitable distance measure. In some embodiments, the present disclosure thus provides for determining, with respect to each pixel in a target image, an anomaly score which represents a distance between the relevant pixel and the nearest corresponding pixel in the nearest-neighbor normal images.

In some embodiments, the features extracted from the training dataset images and the target image represent a pyramid of features, wherein bottom layers result is higher resolution features which encode less semantic context, and upper layers encode lower spatial resolution features but with more semantic context. In some embodiments, to find correspondence between pixels in the selected nearest-neighbor images and the target image, each location is represented using features from the different layers of the feature pyramid, e.g., features from the output of the last specified number of blocks may be concatenated to represent a location in the images. Thus, the feature representation of each location in the images encodes both fine-grained local features as well as global context. In some embodiments, this allows to find correspondence between the target image and nearest-neighbor normal images, without having to perform image alignment. In some embodiments, the present method is scalable and easy to deploy in practice. In some embodiments, the present disclosure provides for representing each location in the images based on calculating an anomaly score of each pixel using each feature layer individually, and combining the scores to obtain a total multi-layer anomaly score for each pixel.

In some embodiments, the present disclosure further provides for sub-image anomaly detection and segmentation based on transferring pretrained features. In some embodiments, the present disclosure provides for using a Vision Transformers feature extraction architecture, wherein each pixel representation may gain its context from across the entire image, with a tendency to focus only on context features that are deemed relevant according to attention layers in the network architecture, and wherein the attention layers in each transformer unit allow the network to learn to avoid including irrelevant context. In some embodiments the feature representation extracted by the Vision Transformers network may be combined in a multi-resolution construction to improve resolution performance while still provide for strong local and global context. In some embodiments, the attentional patterns learned by the Vision Transformers focus on anomalous regions in the images. In some embodiments, this approach may be sued for zero-shot anomaly detection and segmentation, i.e., detecting anomalies without having previously seen normal or anomalous images.

FIG. 1 is a flowchart of the functional steps in a process of the present disclosure for automated detection of anomalous patterns in images, according to some embodiments of the present disclosure.

In some embodiments, in step 100, the present disclosure provides for receiving, as input, a set of training images, wherein at least a majority of the training images represent normal data instances.

In some embodiments, in step 102, the present disclosure provides for receiving a target image for classification. In some embodiments, a target image may be classified as anomalous as a whole. In some embodiments, a target image may undergo sub-image anomaly detection, to classify each pixel in the target image as anomalous.

In some embodiments, in step 104, the present disclosure provides for extracting a set of deep features from multiple locations (e.g., individual pixels or groups of pixels) within each of the training images, as well as similar features from locations within the target image.

In some embodiments, in step 106, the present disclosure provides for calculating distances between the features of each location in the target image, and the k nearest feature representations from the training images.

In some embodiments, in step 108, the present disclosure may classify a location in the target image as anomalous, when the calculated distance exceeds a predetermined threshold.

In some embodiments, in step 110, the present disclosure provides for designating a segment of the target image as comprising anomalous locations (e.g., pixels), based, at least in part, on determining that each location (e.g., pixel) in the segment is anomalous.

In some embodiments, the present disclosure provides for applying a clustering algorithm to the deep feature representations, to obtain clusters of the feature representations. In some embodiments, the distance calculation then comprises calculating distances between the features of each location in the target image and the k nearest means of the clusters.

In some embodiments, the deep features extracting is performed by applying a trained machine learning model to the training images and the target image. In some embodiments, the machine learning model is pre-trained on a provided dataset of images, e.g., a database of images. In some embodiments, the trained machine learning model may undergo additional training using the training images. In some embodiments, the extracted deep features encode high spatial resolution and semantic context.

In some embodiments, the trained machine learning model comprises a deep-learning neural network architecture comprising a plurality of layers, wherein the extracting comprises concatenating features from two or more layers of the plurality of layers. In some embodiments, the two or more layers include the uppermost M layers of the plurality of layers.

In some embodiments, the extracting comprises extracting the feature representations separately from each of two or more layers of the machine learning model, wherein the calculating of the distances comprises calculating a distance separately with respect to the feature representations extracted from each of the two or more layers, and wherein the determining is based on a summation of all of the distance calculations.

In some embodiments, the trained machine learning model comprises a self-attention architecture comprising vision transformers.

In some embodiments, the distance calculation comprises selecting, from the training images, a specified number n of nearest images to the target image, and calculating a distance between the features of each location in the target image and the feature representations from all of the image locations in the n nearest images.

Whole Image Anomaly Detection
Semi-Supervised Anomaly Detection

In some embodiments, the present disclosure provides for an anomaly detection process which learns general features (using any available level of supervision) on related datasets, and then uses the learned features to apply nearest-neighbors anomaly detection methods (e.g. kNN, k-means). In some embodiments, a pretrained feature extraction process may provide for faster deployment times than self-supervised methods. In some embodiments, the present disclosure employs one or more feature extraction methods, e.g., ResNet extractor (He, Kaiming, et al. "Deep residual learning for image recognition." Proceedings of the IEEE conference on computer vision and pattern recognition. 2016.) pre-trained on a provided image dataset (e.g., the Imagenet dataset, http://www.image-net.org/).

In some embodiments, a machine learning model of the present disclosure provides for a training set comprising images (e.g., Imagenet), denoted as $X_{train}=x_1, x_2 \ldots x_N$. In some embodiments, all the images in the training set may be assumed to be within a normal distribution. The present model then uses a feature extractor F, e.g., a provided pre-trained feature extractor, to extract features from the entire training set:

$$f_i = F(x_i) \quad (1)$$

In some embodiments, a feature extractor such as a ResNet feature extractor may be used, which may be pre-trained on the provided training dataset. At first sight it might appear that this supervision is a strong requirement, however such feature extractors are widely available. We will later show experimentally that the normal or anomalous images do not need to be particularly closely related to the Imagenet dataset.

In some embodiments, the feature extraction stage results in a set of embeddings of the images in the training dataset denoted $F_{train}=f_1, f_2 \ldots f_N$.

In some embodiments, a target data sample y may similarly undergo a feature extraction stage denoted $f_y=F(y)$. In some embodiments, the present disclosure may then provide for calculating a K nearest-neighbors (kNN) distance and use it as an anomaly score:

$$d(y) = \frac{1}{k} \sum_{f \in N_k(f_y)} \|f - f_y\|^2 \quad (2)$$

where $N_k(f_y)$ denotes the k nearest embeddings to $f_y$ in the training set $F_{train}$. In some embodiments, the present model may use the Euclidean distance, which often achieves strong results on features extracted by deep networks, however, other distance measures may be used in a similar way. By verifying whether the distance d(y) is larger than a specified threshold, target data instance y may be designated as normal or anomalous.

Unsupervised Anomaly Detection

In some embodiments, the present disclosure provides for an unsupervised approach, wherein the training dataset may not be assumed to consist of only normal data samples. In some embodiments, it is assumed that a small proportion of input images in the training dataset are anomalous.

In some embodiments, the present disclosure provides for a data cleaning stage which removes ag least some of the anomalous training images. accordingly, after performing a feature extraction stage as further explained above, the kNN distance between each input image and the rest of the input images. based on the assumption that anomalous images lie in low density regions, a fraction of the images with the largest kNN distances may be removed, wherein this fraction is selected such that it is larger than the estimated proportion of anomalous input images in the training dataset. As will be further explained below, because the present model requires only a small number of training data instances, the percentage of removed images may be large enough to ensure that the kept the images are likely to be normal (e.g., the cleaning process may remove 50% of training images). After removal of the suspected anomalous input images, the images are now assumed to have a very high-proportion of normal images.

The remainder of the process is identical to the semi-supervised approach described above, wherein the feature extraction stage results in a set of embeddings of the remaining images in the training dataset denoted $F_{train}=f_1, f_2 \ldots f_N$. In some embodiments, a target data sample y may similarly undergo an image extraction stage denoted $f_y=F(y)$. In some embodiments, the present disclosure may then provide for calculating a kNN distance and use it as an anomaly score to determine whether a target data instance y may be designated as normal or anomalous.

Group Image Anomaly Detection

Group anomaly detection tackles the setting where the input sample consists of a set of images. The particular combination is important, but not the order. It is possible that each image in the set will individually be normal but the set as a whole will be anomalous. As an example, assume a training set comprising a plurality of groups consisting of M normal images, each randomly sampled from multiple classes. A trained image-level anomaly detection model will be able to detect anomalous groups containing individual anomalous images, e.g., images taken from classes not seen in training. However, an anomalous group containing multiple images from a seen class, but no images from any other class, will still be classified as normal, because all images in the group are individually normal. Known autoencoder-based group anomaly detection models typically suffer from multiple drawbacks, e.g., high sample complexity, sensitivity to reconstruction metrics, and potential lack of sensitivity to the groups. Accordingly, in some embodiments, the present disclosure provides for a kNN-based approach, which embeds the set by orderless-pooling (e.g., averaging) over all the features of the images in each group. In some embodiments, the disclosed method comprises:

Feature extraction from all images in the group g, $f_g^i = F(x_g^i)$, and orderless pooling of features across the group $$f_g = \frac{\sum_i f_g^i}{\text{number of images}}$$

The remainder of the process is similar to the semi-supervised and unsupervised approaches described above, wherein the feature extraction stage results in a set of pooled group features for the training dataset. In some embodiments, a target group may similarly undergo a feature extraction stage to extract pooled group-level features. In some embodiments, the present disclosure may then provide for calculating a kNN distance and use it as an anomaly score to determine whether a target group instance may be designated as normal or anomalous.

EXPERIMENTAL RESULTS

The present inventors conducted experiments to determine the performance of the present method.

Unimodal Anomaly Detection

The most common setting for evaluating anomaly detection methods is unimodal. In this setting, a classification dataset is adapted by designating one class as normal, while the other classes as anomalies. The normal training set is used to train a model of the present disclosure, wherein all the test data are used to evaluate the inference performance of the model, reported in as ROC area under the curve (ROCAUC).

The experiments were conducted against state-of-the-art methods, including deep-SVDD (Ruff, L., et al. Deep one-class classification. In ICML, 2018) which combines OCSVM with deep feature learning; geometric (Golan, I. and El-Yaniv, R. Deep anomaly detection using geometric transformations. In NeurIPS, 2018); GOAD (Bergman, 1. and Hoshen, Y. Classification-based anomaly detection for general data. In ICLR, 2020); and Multi-Head RotNet (MHRot) (Hendrycks, D., et al. Using self-supervised learning can improve model robustness and uncertainty. In NeurIPS, 2019).

The Cifar10 dataset used in the experiments is a common dataset for evaluating unimodal anomaly detection. CIFAR10 contains 32×32 color images from 10 object classes. Each class has 5000 training images and 1000 test images. The results are presented in Table 1 below. As can be seen, the present model significantly outperforms all other methods.

TABLE 1

Anomaly Detection Accuracy on Cifar10 (ROCAUC %)

| | OC-SVM | Deep SVDD | GEOM | GOAD | MHRot | Present Method |
|---|---|---|---|---|---|---|
| 0 | 70.6 | 61.7 ± 1.3 | 74.7 ± 0.4 | 77.2 ± 0.6 | 77.5 | 93.9 |
| 1 | 51.3 | 65.9 ± 0.7 | 95.7 ± 0.0 | 96.7 ± 0.2 | 96.9 | 97.7 |
| 2 | 69.1 | 50.8 ± 0.3 | 78.1 ± 0.4 | 83.3 ± 1.4 | 87.3 | 85.5 |
| 3 | 52.4 | 59.1 ± 0.4 | 72.4 ± 0.5 | 77.7 ± 0.7 | 80.9 | 85.5 |
| 4 | 77.3 | 60.9 ± 0.3 | 87.8 ± 0.2 | 87.8 ± 0.7 | 92.7 | 93.6 |
| 5 | 51.2 | 65.7 ± 0.8 | 87.8 ± 0.1 | 87.8 ± 0.6 | 90.2 | 91.3 |
| 6 | 74.1 | 67.7 ± 0.8 | 83.4 ± 0.5 | 90.0 ± 0.6 | 90.9 | 94.3 |
| 7 | 52.6 | 67.3 ± 0.3 | 95.5 ± 0.1 | 96.1 ± 0.3 | 96.5 | 93.6 |
| 8 | 70.9 | 75.9 ± 0.4 | 93.3 ± 0.0 | 93.8 ± 0.9 | 95.2 | 95.1 |
| 9 | 50.6 | 73.1 ± 0.4 | 91.3 ± 0.1 | 92.0 ± 0.6 | 93.3 | 95.3 |
| Avg | 62.0 | 64.8 | 86.0 | 88.2 | 90.1 | 92.5 |

Note that the performance of the present model is deterministic for a given training and test set (e.g., no variation between runs). It may be observed that OC-SVM and Deep-SVDD are the weakest performers. This is because both the raw pixels as well as features learned by Deep-SVDD are not discriminative enough for the distance to the center of the normal distribution to be successful. Geometric and later approaches (GOAD and MHRot) perform better, but do not exceed 90% ROCAUC. The performance evaluation were made without finetuning between the dataset and simulated anomalies (which improves performance on all methods).

Geometric, GOAD and the present method were further evaluated on the Fashion MNIST dataset, consisting of 6000 training images per class and a test set of 1000 images per class. A comparison of the present method against OCSVM, Deep SVDD, Geometric and GOAD is shown in Table 2 below. As can be seen, the present method outperforms all other methods, despite the data being visually quite different from the Imagenet dataset from which the features were extracted.

Geometric, GOAD and the present method were further evaluated on the CIFAR100 dataset. CIFAR100 has 100 fine-grained classes with 500 training images each, or 20 coarse-grained classes with 2500 training images each. In the present experiments, the coarse-grained version is used. The experiment protocol is the same as CIFAR10. A comparison of the present method against OCSVM, Deep SVDD, Geometric and GOAD is shown in Table 2 below. As can be seen, the results are consistent with those obtained for CIFAR10.

TABLE 2

Anomaly Detection Accuracy on Fashion MNIST and CIFAR10 (ROCAUC %)

| | OC-SVM | GEOM | GOAD | Present Method |
|---|---|---|---|---|
| FashionMNIST | 92.8 | 93.5 | 194.1 | 94.4 |
| CIFAR100 | 62.6 | 78.7 | | 89.3 |

Comparisons Against MHRot:

A further comparison between the present model and MHRot was conducted on several commonly-used datasets. This comparison gives further evidence for the generality of the present model, in datasets where RotNet-based methods are not restricted by low-resolution, or by image invariance to rotations. A ROCAUC score was computed with respect to each of the first 20 categories in each dataset, by alphabetical order, designated as normal for training. The standard training and test splits are used. All test images from all dataset categories are used for inference, with the respective category designated as normal and all the rest as anomalies. For brevity of presentation, the average ROCAUC score of the tested classes is reported for the following datasets:

102 Category Flowers: This dataset consists of 102 categories of flowers, consisting of 10 training images each. The test set consists of between 30-200 images per-class.

Caltech-UCSD Birds 200: This dataset consists of 200 categories of bird species. Classes typically contain between 55-60 images split evenly between training and test.

Cats Vs Dogs: This dataset consists of 2 categories—dogs and cats, with 10,000 training images each. The test set consist of 2,500 images for each class. Each image contains either a dog or a cat in various scenes and taken from different angles. The data was extracted from the ASIRRA dataset, we split each class to the first 10,000 images as training and the last 2,500 as test.

The results are shown in Table 3 below. As can be seen, the present model significantly outperforms MHRot on all datasets.

TABLE 3

MHRot vs. the present model on Flowers, Birds, CatsVsDogs (Average Class ROCAUC %)

| Dataset | MHRot | Present Model |
| --- | --- | --- |
| Oxford Flowers | 65.9 | 93.9 |
| UCSD Birds 200 | 64.4 | 95.2 |
| CatsVsDogs | 88.5 | 97.5 |

Effect of Network Depth:

Deeper networks trained on large datasets such as the Imagenet dataset, learn features that generalize better than shallow network. Accordingly, the present inventors investigated the performance of the present model when using features from networks of different depths. Specifically, ROCAUC was plotted for a ResNet-based neural network with 50, 101, and 152 layers. The present model works well with all networks but performance is improved with greater network depth.

Figure 2A:
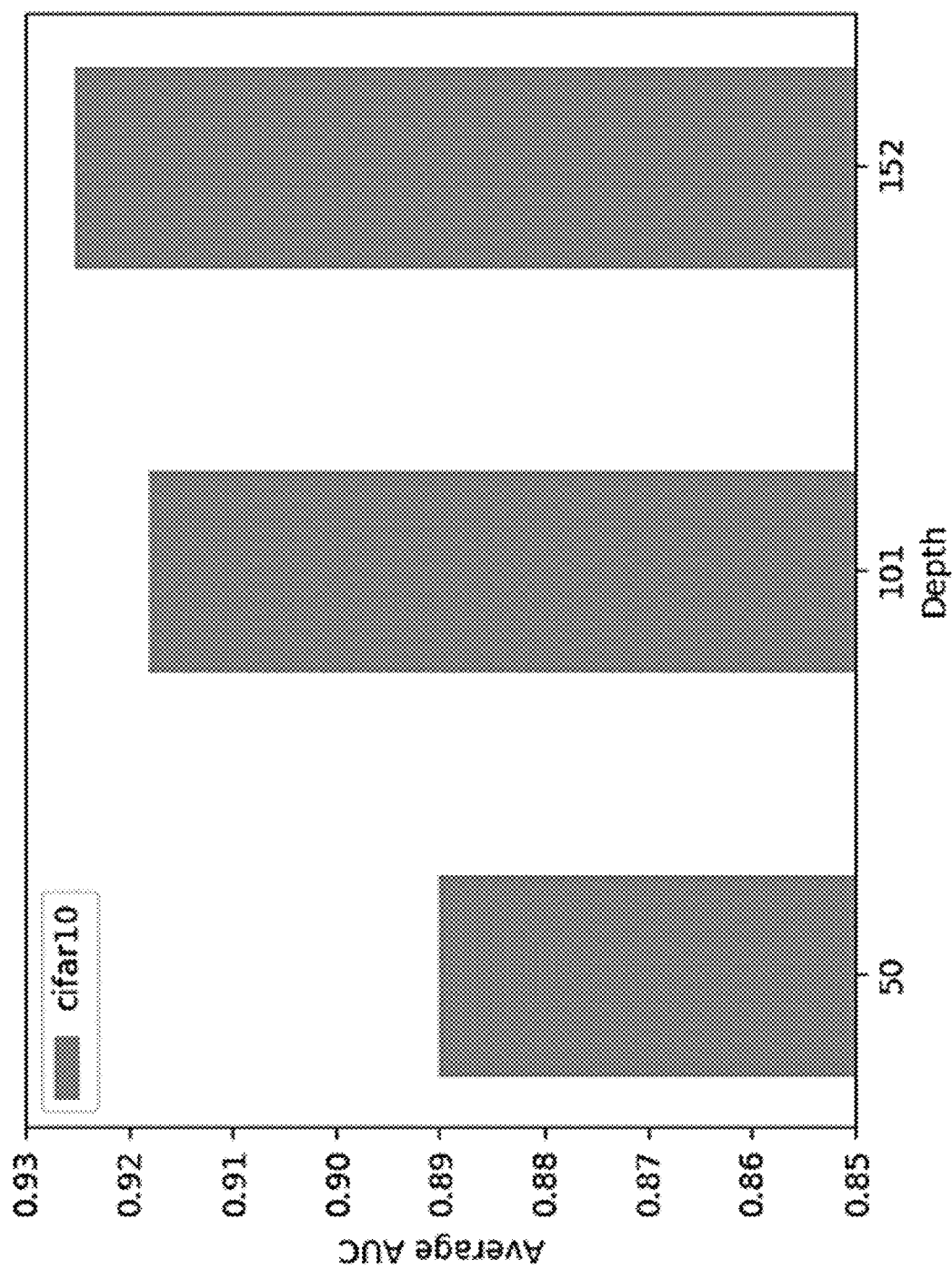
FIGS. 2A and 2B illustrate the results of various network depths (i.e., number of ResNet layers) with respect to the Cifar10 and FashionMNIST datasets, according to some embodiments of the present disclosure.
Figure 2B:
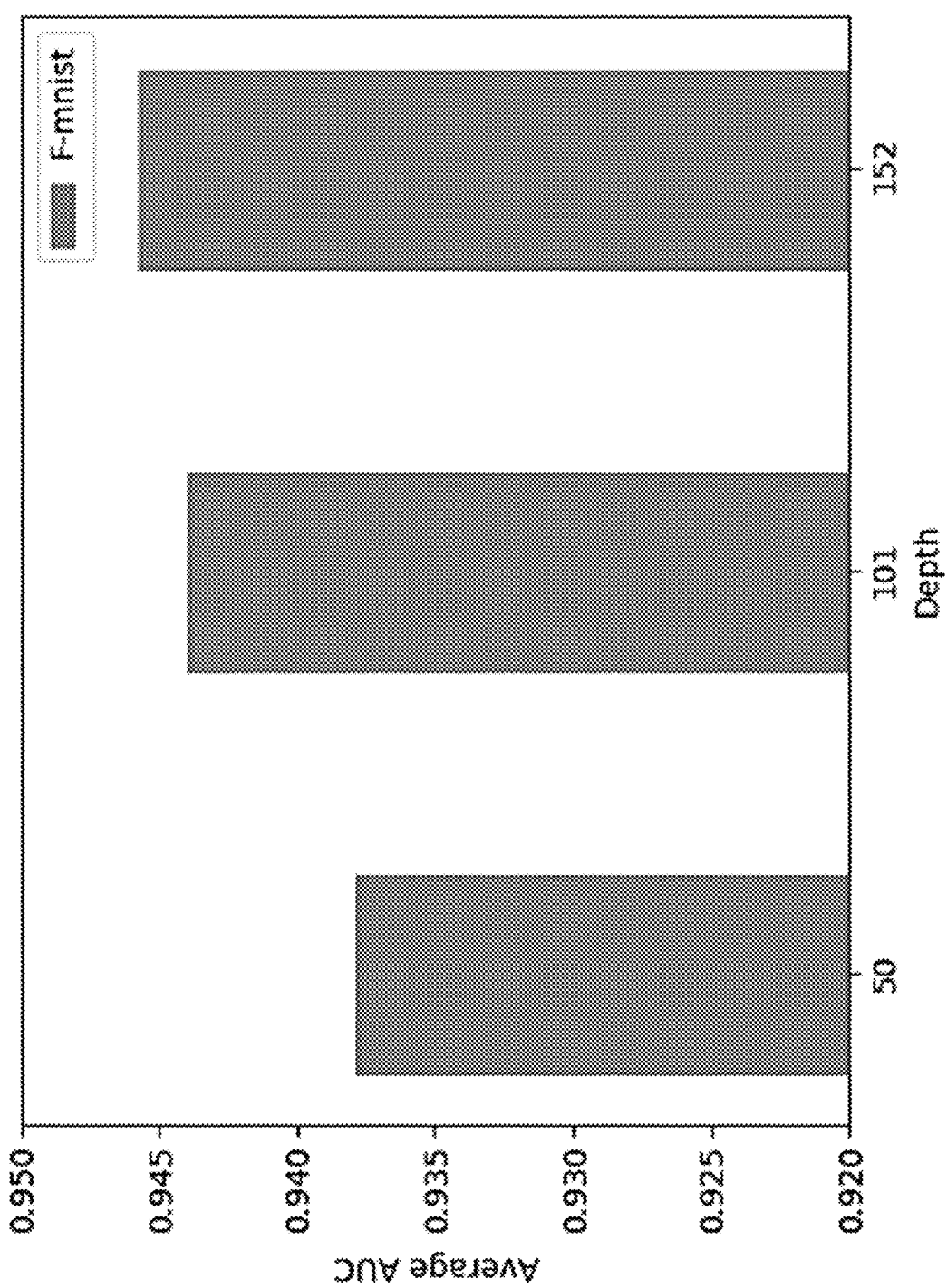

FIGS. 2A and 2B illustrate the results of various network depths (i.e., number of ResNet layers) with respect to the Cifar10 and FashionMNIST datasets.

Figure 3A:
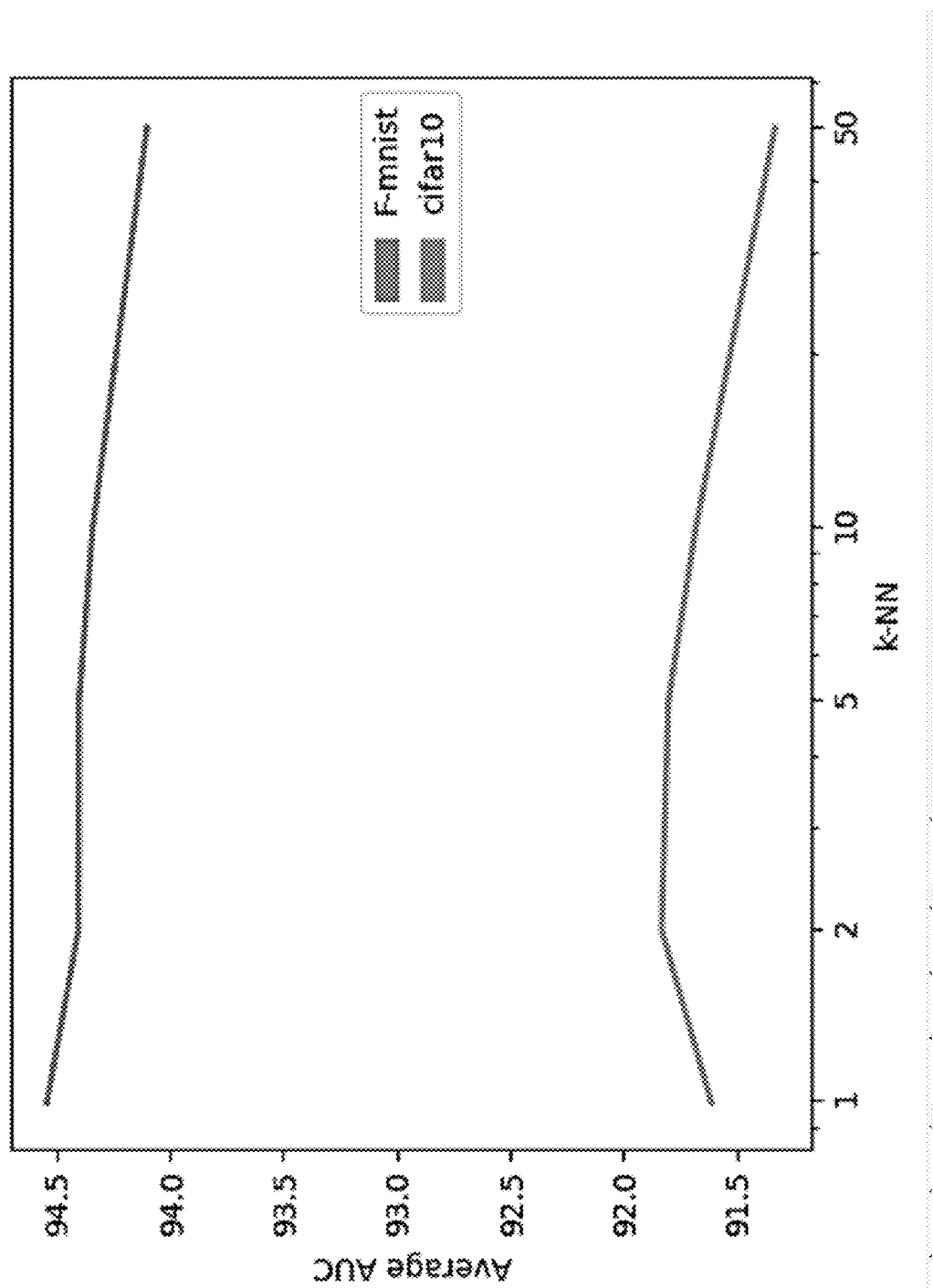
FIGS. 3A-3C show a comparison of average CIFAR10 and FashionMNIST ROCAUC for different numbers of nearest neighbors, as well as a comparison between the present model and Geometric on CIFAR10 and FashionMNIST, according to some embodiments of the present disclosure.

Effect of the Number of Neighbors:

The only free parameter in the present model is the number of neighbors used in kNN. FIG. 3A shows a comparison of average CIFAR10 and FashionMNIST ROCAUC for different numbers of nearest neighbors. The differences are not particularly large, but 2 neighbors usually provide the best results.

Effect of Data Invariance:

Methods that rely on predicting geometric transformations typically use a data prior to the effect that images have a predetermined orientation (for rotation prediction) and centering (for translation prediction). This assumption is often unwarranted in the case of actual real-life images. Two interesting cases not satisfying this assumption are aerial and microscope images, as they do not have a preferred orientation, making rotation prediction ineffective. Accordingly, the present inventors have conducted experiments with respect to the following datasets:

DIOR: Dior is an aerial image dataset. The images are registered but do not have a preferred orientation. The dataset consists of 19 object categories that have more than 50 images each, with resolution above 120×120 (the median number of images per-class is 578). A bounding boxes is provided with the data, such that each object may be extracted with a bounding box of at least 120 pixels in each axis. The bounding box is then resized to 256×256 pixels. The same experimental protocol as in the earlier datasets is then followed. The results are summarized in Table 4 below. As can be seen, the present model significantly outperforms MHRot. This is due both to the generally stronger performance of the feature extractor as well as the lack of rotational prior that is strongly used by RotNet-type methods. Note that the images are centered, a prior used by the MHRot translation heads.

WBC: To further investigate the performance on difficult real world data, the present inventors performed an experiment on the WBC Image Dataset, which consists of high-resolution microscope images of different categories of white blood cells. The data do not have a preferred orientation. Additionally the dataset is very small, only a few tens of images per-class. Dataset 1 was used, which was obtained from Jiangxi Telecom Science Corporation, China, and was split into the 4 different classes that contain more than 20 images each. The first 80% of images in each class were used for the training set, and the last 20% were used as the test set. The results are presented in Table 4 below. As expected, the present model outperforms MHRot by a significant margin showing its greater applicability to real world data.

TABLE 4

Anomaly Detection Accuracy on DIOR and WBC (ROCAUC %)

| Dataset | MHRot | DN2 |
| --- | --- | --- |
| DIOR | 83.2 | 192.2 |
| WBC | 60.5 | 82.9 |

Multimodal Anomaly Detection

It has been argued that unimodal anomaly detection is less realistic as in practice, normal distributions contain multiple classes. While it may be assumed that both settings occur in practice, the present inventors further present results on the scenario where all classes are designated as normal apart from a single class that is taken as anomalous (e.g., all CIFAR10 classes are normal apart from "Cat"). Note that class labels of the different classes that compose the normal class are not provided, but rather they are considered to be a single multimodal class. This setup is believed to simulate the realistic case of having a complex normal class consisting of many different unlabeled types of data.

Accordingly, the present inventors compared the present model against Geometric on CIFAR10 and CIFAR100 on this setting. The average ROCAUC across all the classes is detailed in Table 5. the present model achieves significantly stronger performance than Geometric. It is believed that occurs because Geometric requires the network not to generalize on the anomalous data. However, once the training data is sufficiently varied the network can generalize even on unseen classes, making the method less effective. This is particularly evident on CIFAR100.

TABLE 5

Anomaly Detection Accuracy on Multimodal
Normal Image Distributions (ROCAUC %)

| Dataset | Geometric | The present model |
| --- | --- | --- |
| CIFAR10 | 61.7 | 71.7 |
| CIFAR100 | 57.3 | 71.0 |

Generalization from Small Training Datasets

Figure 3B:
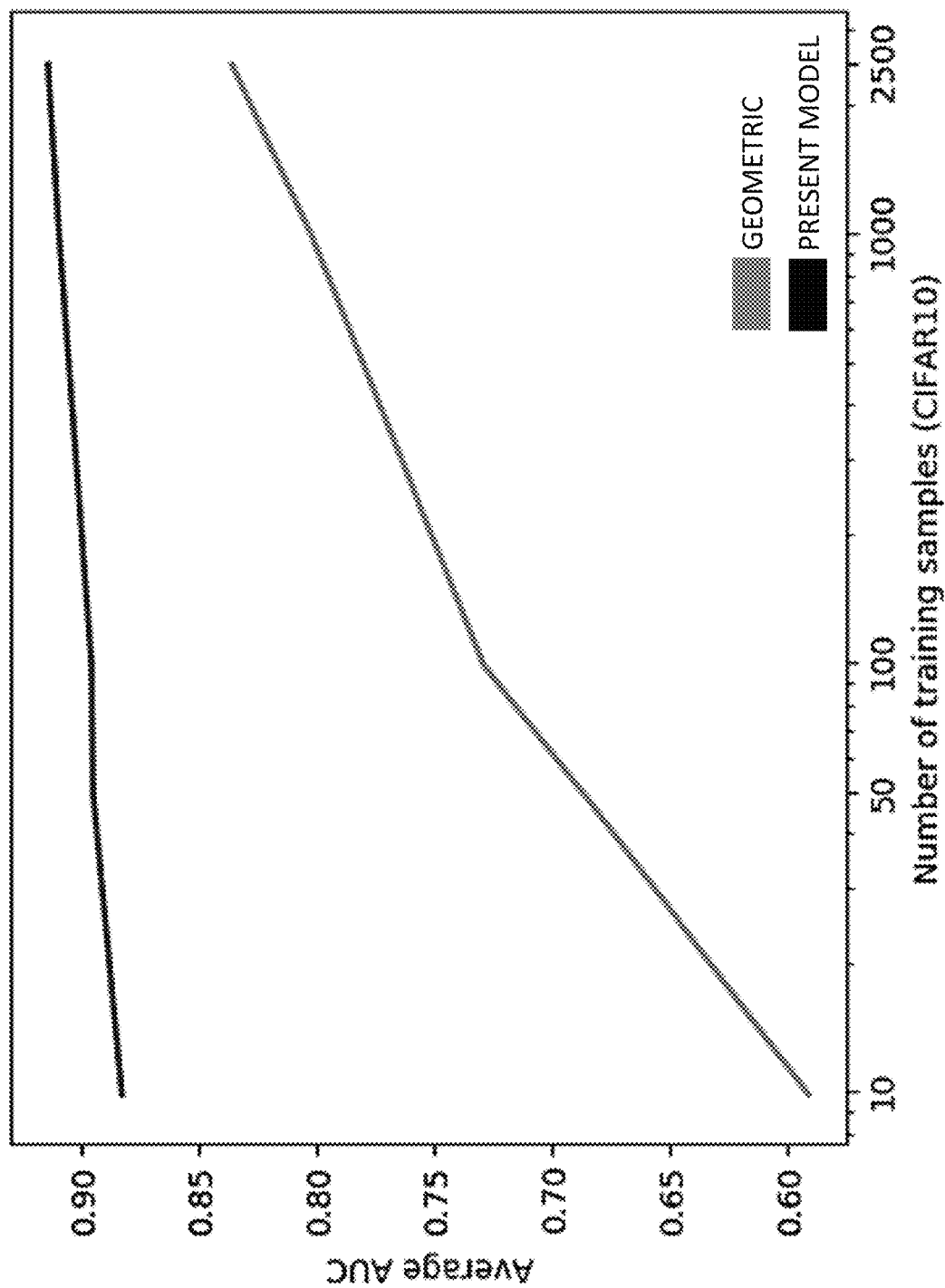
Figure 3C:
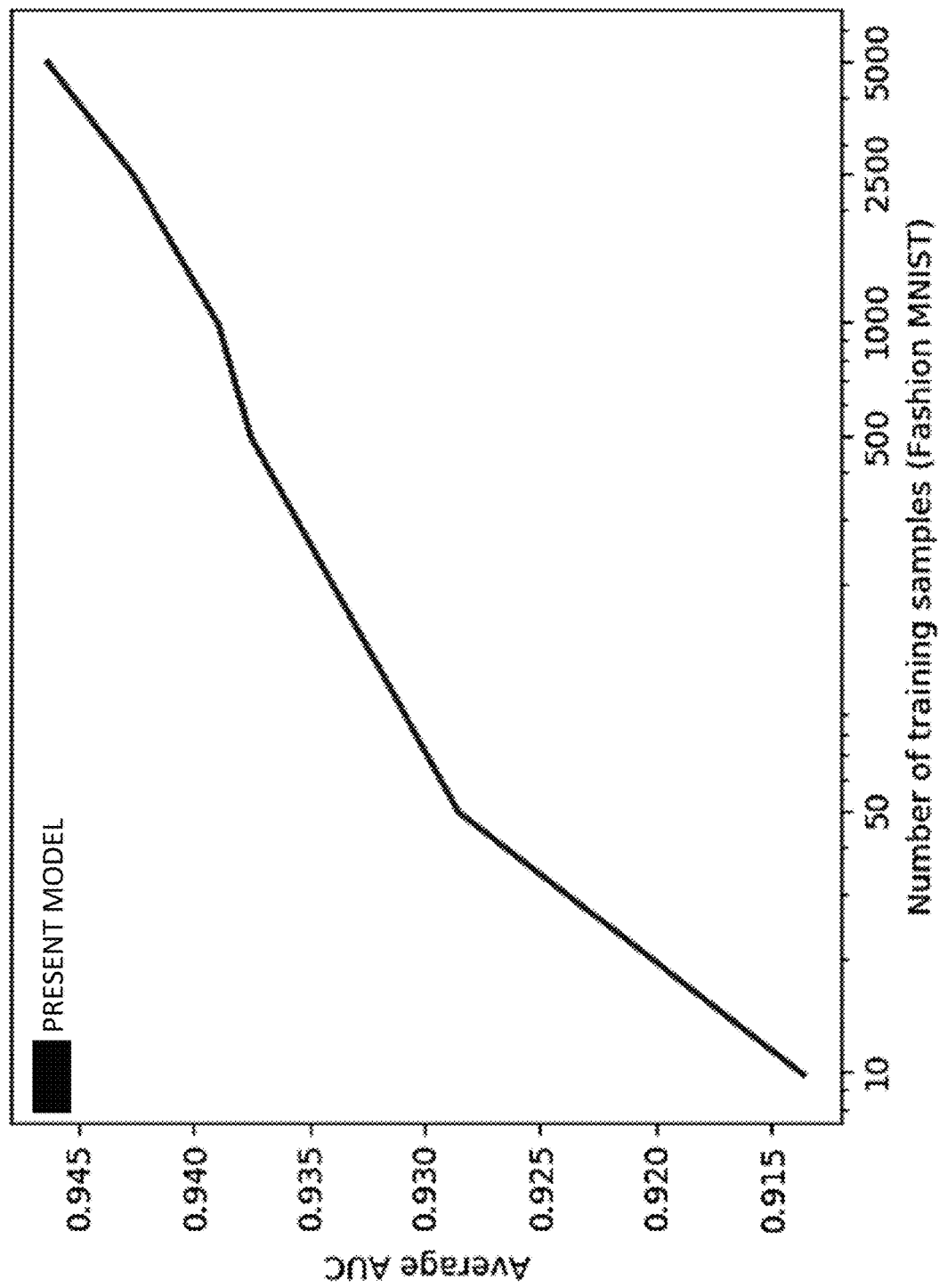

One of the advantage of the present model is its ability to generalize from very small datasets. This is not possible with self-supervised learning-based methods, which do not learn general enough features to generalize to normal test images. A comparison between the present model and Geometric on CIFAR10 is presented in FIG. 3B, wherein the number of training images is plotted against the average ROCAUC. As can be seen, the present model can detect anomalies very accurately even from as few as 10 images, while Geometric deteriorates quickly with decreasing number of training images. A similar plot is presented for FashionMNIST in FIG. 3C. Geometric is not shown as it suffered from numerical issues for small numbers of images. The present model again achieved strong performance from very few images.

Unsupervised Anomaly Detection

Figure 4:
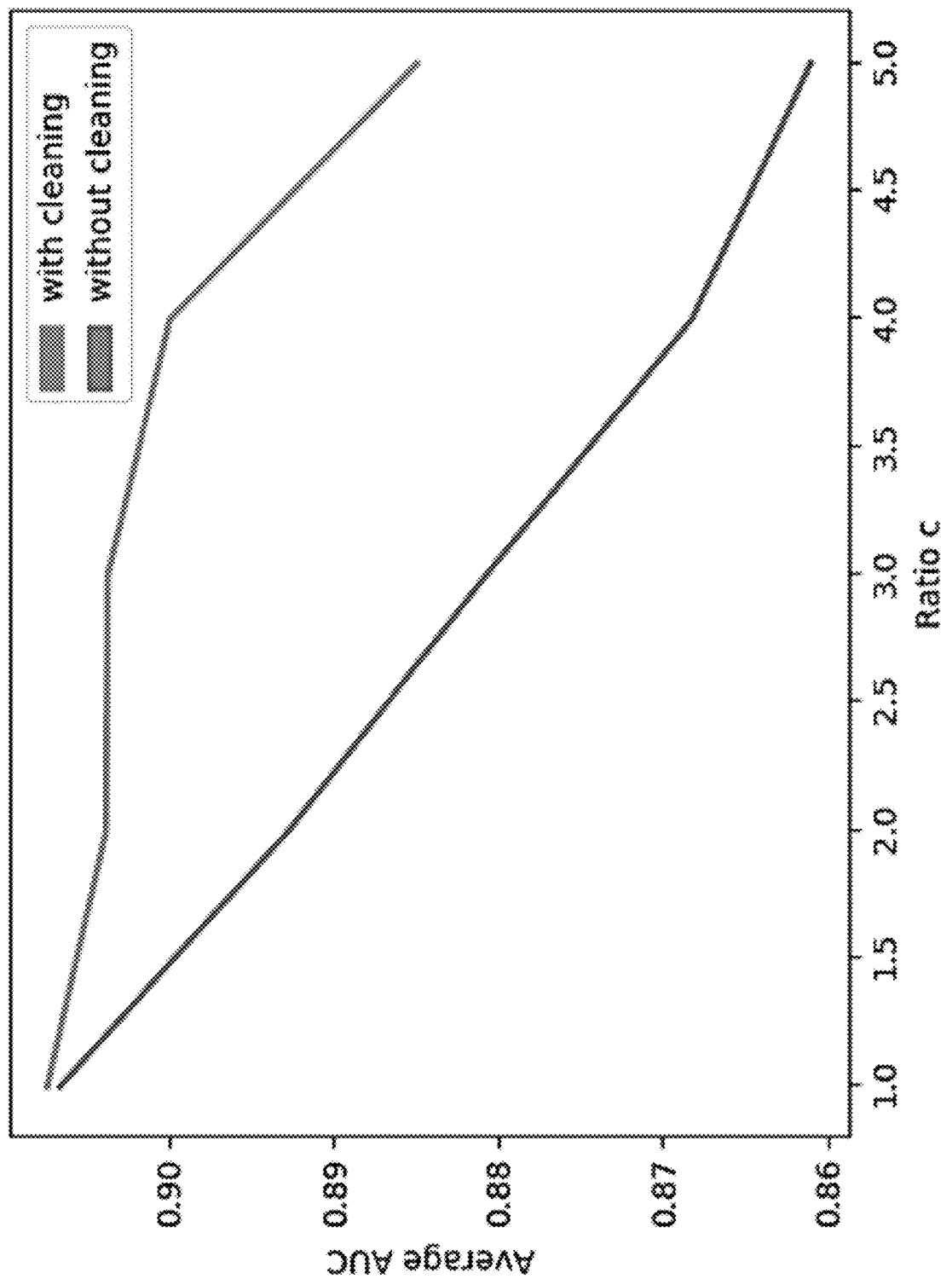
FIG. 4 shows the performance of the present model as function of the percentage of anomalies in the training set, according to some embodiments of the present disclosure.

There are settings where the training set does not consist of purely normal images, but rather a mixture of unlabeled normal and anomalous images. In most cases, it may be assumed that that anomalous images comprise only a small fraction of the number of the normal images. The performance of the present model as function of the percentage of anomalies in the training set is presented in FIG. 4. The performance is somewhat degraded as the percentage of training set impurities exist. To improve the performance, a cleaning stage may be performed, which removes approx. 50% of the training set images that have the most distant kNN inside the training set. The cleaning procedure is clearly shown to significantly improve the performance degradation as percentage of impurities.

Group Anomaly Detection

To compare to existing baselines, the present method was tested on a group anomaly detection task detailed in D'Oro, P., et al. Group anomaly detection via graph autoencoders. 2019. The data consists of normal sets containing 10-50 MNIST images of the same digit, and anomalous sets containing 10-50 images of different digits. By simply computing the trace-diagonal of the covariance matrix of the per-image ResNet features in each set of images, a 0.92 ROCAUC was achieved.

Figure 5:
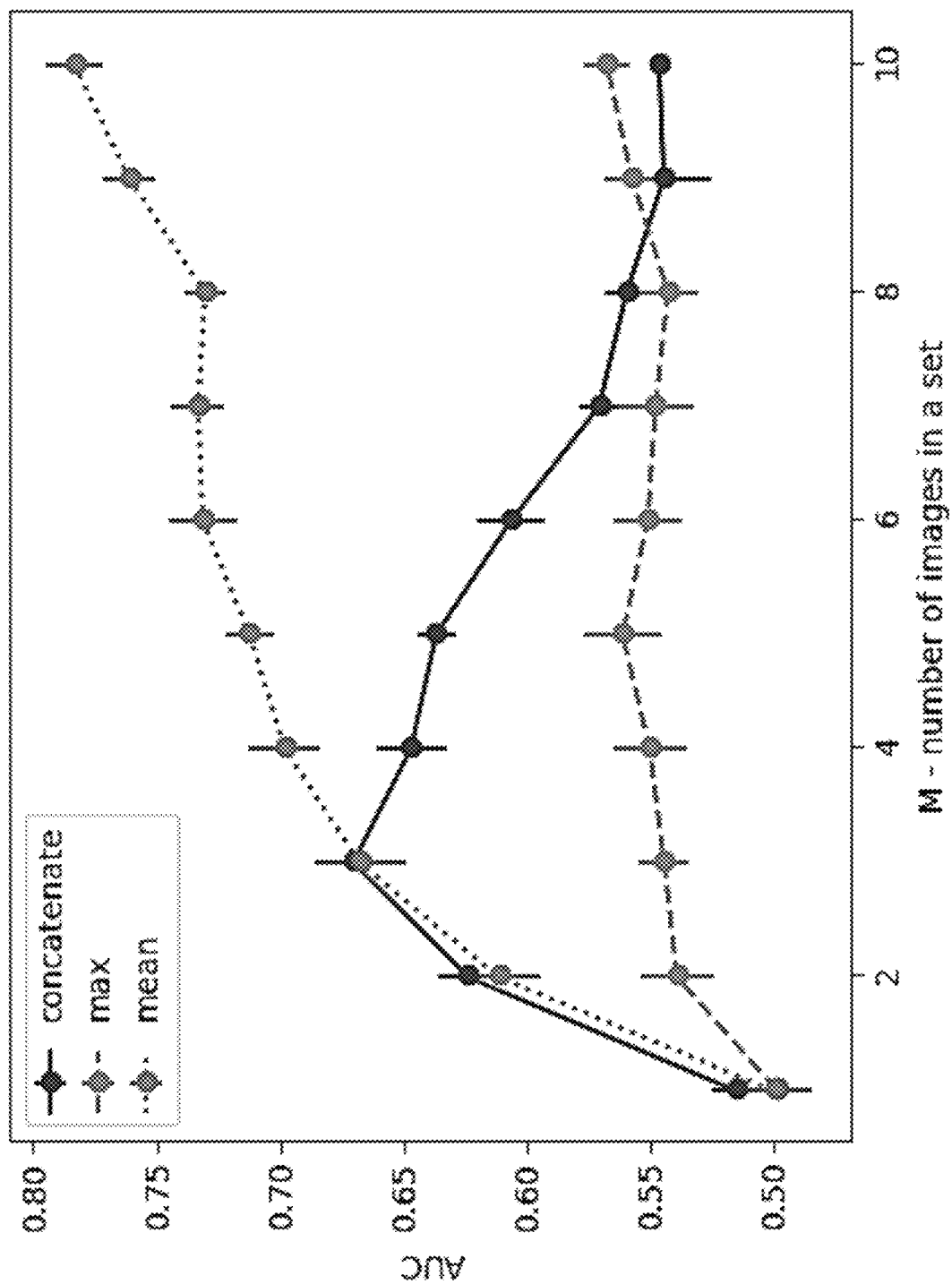
FIG. 5 shows the average ROCAUC for anomaly detection using the present model on the concatenated features of each individual image in the set, according to some embodiments of the present disclosure.

As a harder task for group anomaly detection in unordered image sets, the normal class was designated as sets consisting of exactly one image from each of the M CIFAR10 classes (specifically the classes with ID 0 ... M–1) while each anomalous set consisted of M images selected randomly among the same classes (some classes had more than one image and some had zero). FIG. 5 shows the average ROCAUC for anomaly detection using the present model on the concatenated features of each individual image in the set. As expected, this baseline works well for small values of M where there is a sufficient number of examples of all possible permutations of the class ordering. However, as M grows larger (M>3), its performance decreases, as the number of permutations grows exponentially. This method, with 1000 image sets for training, is also compared to nearest neighbors of the orderless max-pooled and average-pooled features, wherein the result shows that mean-pooling significantly outperforms the baseline for large values of M. While performance of the concatenated features may be improved by augmenting the dataset with all possible orderings of the training sets, it will grow exponentially for a non-trivial number of M making it an ineffective approach.

Implementation

In all experiments of the present model reported hereinabove, the input images are resized to 256×256, a center crop of size 224×224 is taken, and pre-trained ResNet (consisting of 101 layers) pre-trained on the Imagenet dataset, is used to extract the features after the global pooling layer. This feature is the image embedding.

Analysis—kNN vs. One-Class Classification

Figure 6A:
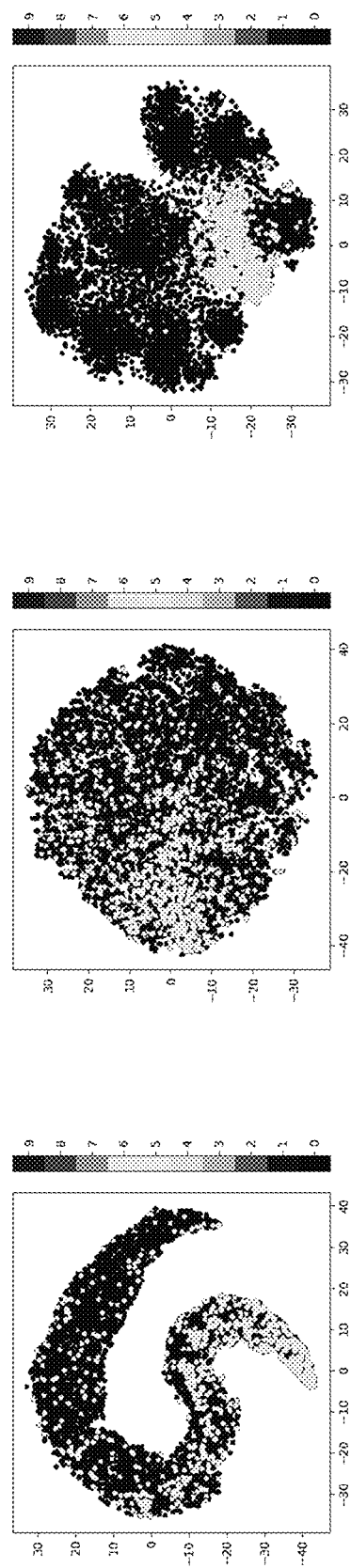
FIGS. 6A-6B shows t-SNE plots of the test set features of CIFAR10, according to some embodiments of the present disclosure.
Figure 6B:
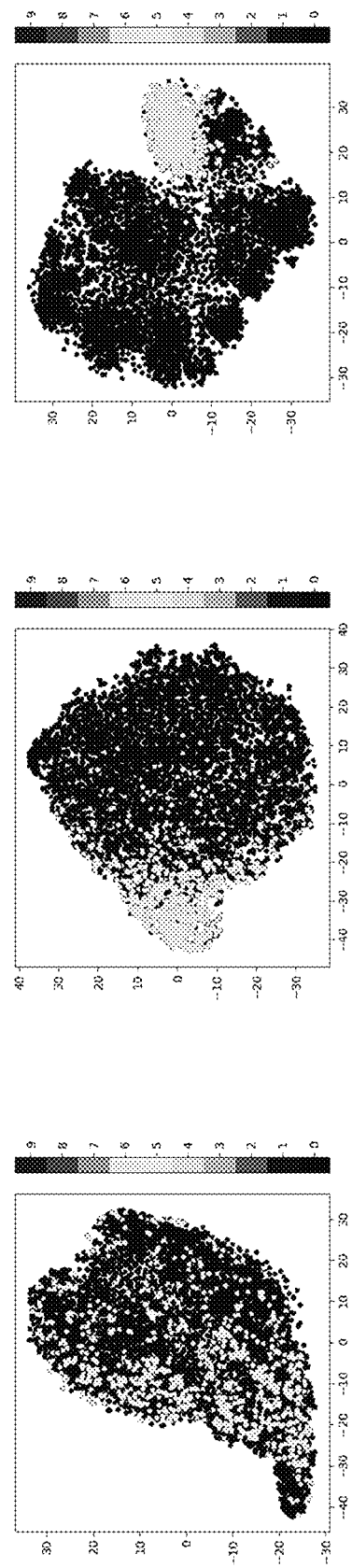

In the experiments reported hereinabove, it was found that kNN achieved very strong performance for anomaly detection tasks. FIGS. 6A-6B shows t-SNE plots of the test set features of CIFAR10. The normal class is plotted in light color, while the anomalous data is marked in marked in dark color. The t-SNE plots of the features learned by SVDD are shown on the left, Geometric in the center, and the Imagenet dataset pre-trained feature extractor on the right, where the normal class is Airplane (FIG. 6A) and Automobile (FIG. 6B. As can be seen, the Imagenet-pretrained features clearly separate the normal class (light) and anomalies (dark). Geometric learns poor features of Airplane and reasonable features on Automobile. Deep-SVDD does not learn features that allow clean separation. It is clear that the pre-trained features embed images from the same class into a fairly compact region. It is therefore expected that the density of normal training images is much higher around normal test images than around anomalous test images. This may explain the success of kNN methods.

kNN has linear complexity in the number of training data samples. Methods such as One-Class SVM or SVDD attempt to learn a single hypersphere, and use the distance to the center of the hypersphere as a measure of anomaly. In this case the inference runtime is constant in the size of the training set, rather than linear as in the kNN case. The drawback is the typical lower performance. Another potential way of decreasing the inference time is using K-means clustering of the training features. This speeds up inference by a ratio of $$\frac{N}{K}.$$

It may be therefore suggested to speed up the present model by clustering the training features into K clusters and then performing kNN on the clusters rather than the original features. Table 6 below presents a comparison of performance of the present model and its K-means approximations with different numbers of means (we use the sum of the distances to the 2 nearest neighbors). As can be seen, for a small loss in accuracy, the retrieval speed can be reduced significantly.

TABLE 6

Accuracy on CIFAR10 using K-means approximations
and full kNN (ROCAUC %)

| C = 1 | C = 3 | C = 5 | C = 10 | kNN |
| --- | --- | --- | --- | --- |
| 91.94 | 92.00 | 91.87 | 91.64 | 92.52 |

Use of Pre-Trained Features

In some embodiments, the present disclosure provides for an anomaly detection method that adapts pretrained features and mitigates or avoids catastrophic collapse. Experimental results show that the present disclosure significantly outperform current methods while addressing their limitations.

Anomaly detection methods require high-quality features. One way of obtaining strong features is to adapt pre-trained features to anomaly detection on the target distribution. Unfortunately, simple adaptation methods often result in feature deterioration and degraded performance. Deep-SVDD (see Lukas Ruff, et al. Deep one-class classification. In ICML, 2018) combats collapse by removing biases from architectures, but this limits the adaptation performance gain. Accordingly, in some embodiments, the present disclosure provides for two methods for combating feature collapse:

A variant of early stopping that dynamically learns the stopping iteration, and elastic regularization inspired by continual learning.

As noted earlier, in the computational anomaly detection task, the learner observes a set of training examples. The learner is then tasked to classify novel test samples as normal or anomalous. There are multiple anomaly detection settings investigated in the literature, corresponding to different training conditions. One such setting assumes that only normal images are used for training. Another setting provides data samples simulating anomalies.

In recent years, deep learning methods have been introduced for anomaly detection, typically extending classical methods with deep neural networks. Different auxiliary tasks (e.g. autoencoders or rotation classification) are used to learn representations of the data, while a great variety of anomaly criteria are then used to determine if a given sample is normal or anomalous. An important issue for current methods is the reliance on limited normal training data for representation learning, which limits the quality of learned representations. One solution is to pretrain features on a large external dataset, and use the features for anomaly detection. However, as there is likely to be some mismatch between the external dataset and the task of anomaly detection on the target distribution, feature adaptation is an attractive option. Unfortunately, feature adaptation for anomaly detection often suffers from catastrophic collapse—a form of deterioration of the pre-trained features, where all the samples, including anomalous, are mapped to the same point. DeepSVDD was proposed to overcome collapse by removing biases from the model architecture, but this restricts network expressively and limits the pre-trained models that can be borrowed off-the-shelf. It was also proposed to jointly train anomaly detection with the original task which has several limitations and achieves only limited adaptation success.

Accordingly, the present disclosure provides for two techniques to overcome catastrophic collapse:

An adaptive early stopping method that selects the stopping iteration per-sample, using a novel generalization criterion, and an elastic regularization, motivated by continual learning, that postpones the collapse.

the present disclosure also provides an extensive evaluation of Imagenet-pretrained features on one-class anomaly detection. Thorough experiments demonstrate that the present method outperform the state-of-the-art by a wide margin.

Feature Adaptation for Anomaly Detection

The present general framework examines several adaptation-based anomaly detection methods. Assume a set $D_{train}$ of normal training samples: $x_1, x_2 \ldots x_N$. The framework consists of three steps:

Feature extractor pretraining: A pre-trained feature extractor $\psi_0$ is typically learned using self-supervised learning (auto-encoding, rotation or jigsaw prediction). The loss function of the auxiliary task may be denoted $L_{pretrain}$. The auxiliary task can be learned either on the training set $D_{train}$ or on an external dataset $D_{pretrain}$ (such as the Imagenet dataset).

Feature adaptation: Features trained on auxiliary tasks or datasets may require adaptation before being used for anomaly scoring on the target data. This can be seen as a finetuning stage of the pre-trained features on the target training data. The feature extractor after adaptation may be denoted $\psi$.

Anomaly scoring: Having adapted the features for anomaly detection, the features $\psi(x_1), \psi(x_2) \ldots \psi(x_N)$ of the training set samples are extracted. The method then proceeds to learn a scoring function, which describes how anomalous a sample is. Typically, the scoring function seeks to measure the density of normal data around the test sample $\psi(x)$ (either by direct estimation or via some auxiliary task) and assign a high anomaly score to low density regions.

DeepSVDD was proposed, which suggests to first train an autoencoder E on the normal-only train images. The encoder is then used as the initial feature extractor $\psi_0(x)=E(x)$. As the features of the encoder are not specifically adapted to anomaly detection, DeepSVDD adapts $\psi$ on the training data. The adaptation takes place by minimizing the compactness loss:

$$L_{compact} = \Sigma_{x \in D_{train}} \|\psi(x) - c\|^2 \qquad (3)$$

where c is a constant vector, typically the average of $\psi_0(x)$ on the training set. However, the trivial solution $\psi=c$ poses a concern, and therefore an architectural restrictions may be implemented to mitigate it, most importantly removing the biases from all layers. However, the effect of adaptation of the features in DeepSVDD does not outperform simple feature whitening.

Joint optimization (JO) was proposed, and suggests using a deep feature extractor trained for object classification on the ImageNet dataset. Due to fear of "learning a trivial solution due to the absence of a penalty for miss-classification," the method does not adapt by finetuning on the compactness loss only. Instead, the task setting is relaxed, by assuming that a number (~50 k) of labelled original ImageNet images, $D_{pretrain}$, are still available at adaptation time. They proposed to train the features $\psi$ under the compactness loss jointly with the original ImageNet classification linear layer W and its classification loss, here the CE loss with the true label $\ell_{pretrain}(p,y) = -\log(p_y)$:

$$L_{joint} = \Sigma_{(x,y) \in D_{pretrain}} \ell_{pretrain}((W\psi(x)),y) + \alpha \Sigma_{x \in D_{train}} \|(x) - c\|^2 \qquad (4)$$

where W is the final linear classification layer and $\alpha$ is a hyper-parameter weighting the two losses. It is noted that the method has two main weaknesses: (i) it requires retaining a significant number of the original training images which can be storage intensive, and (ii) jointly training the two tasks may reduce the anomaly detection task accuracy, which is the only task of interest in this context.

Accordingly, in some embodiments, the present disclosure provides for feature adaptation for anomaly detection, which adapts general pre-trained features to anomaly detection on the target distribution. In some embodiments, the present method is agnostic to the specific pretrained feature extractor. Based on experiments conducted by the present inventors, it was found that the Imagenet dataset pretrained features achieve better results.

In some embodiments, the present method uses the compactness loss (Eq. 3) to adapt the general pre-trained features to the task of anomaly detection on the target distribution. However, instead of constraining the architecture or introducing external data into the adaptation procedure, the present method tackles catastrophic collapse directly. The main issue is that the optimal solution of the compactness loss can result in "collapse," where all possible input values are mapped to the same point ($\psi(x)=c$, $\forall x$). Learning such features will not be useful for anomaly detection, as both normal and anomalous images will be mapped to the same output, preventing separability. The issue is broader than the trivial "collapsed" solution after full convergence, but rather the more general issue of feature deterioration, where the original good properties of the pretrained features are lost. Even a non-trivial solution might not require the full discriminative ability of the original features which are none-the-less important for anomaly detection.

To avoid this collapse, the present method provides for two options: (i) finetuning the pretrained extractor with compactness loss (Eq. 3) and using sample-wise early stopping, and (ii) when collapse happens prematurely, before any significant adaptation happens, mitigating it using a Continual Learning-inspired adaptive regularization.

Figure 7:
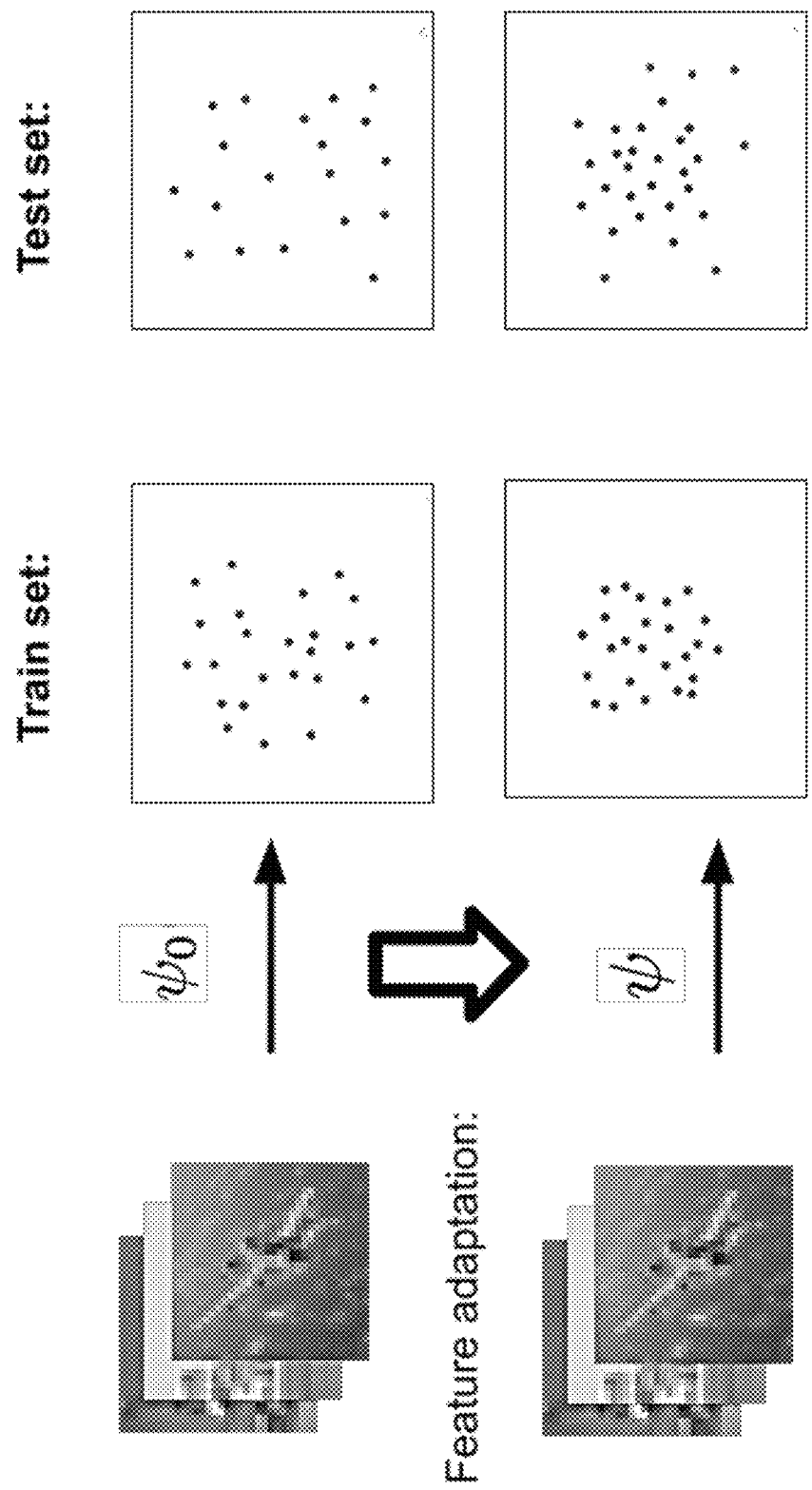
FIG. 7 is an illustration of the present feature adaptation procedure, wherein the pre-trained feature extractor $\psi_0$ is adapted to make the normal features more compact resulting in feature extractor $\psi$, according to some embodiments of the present disclosure.

FIG. 7 is an illustration of the present feature adaptation procedure, wherein the pre-trained feature extractor $\psi_0$ is adapted to make the normal features more compact resulting in feature extractor $\psi$. After adaptation, anomalous test images lie in a less dense region of the feature space.

Figure 8A:
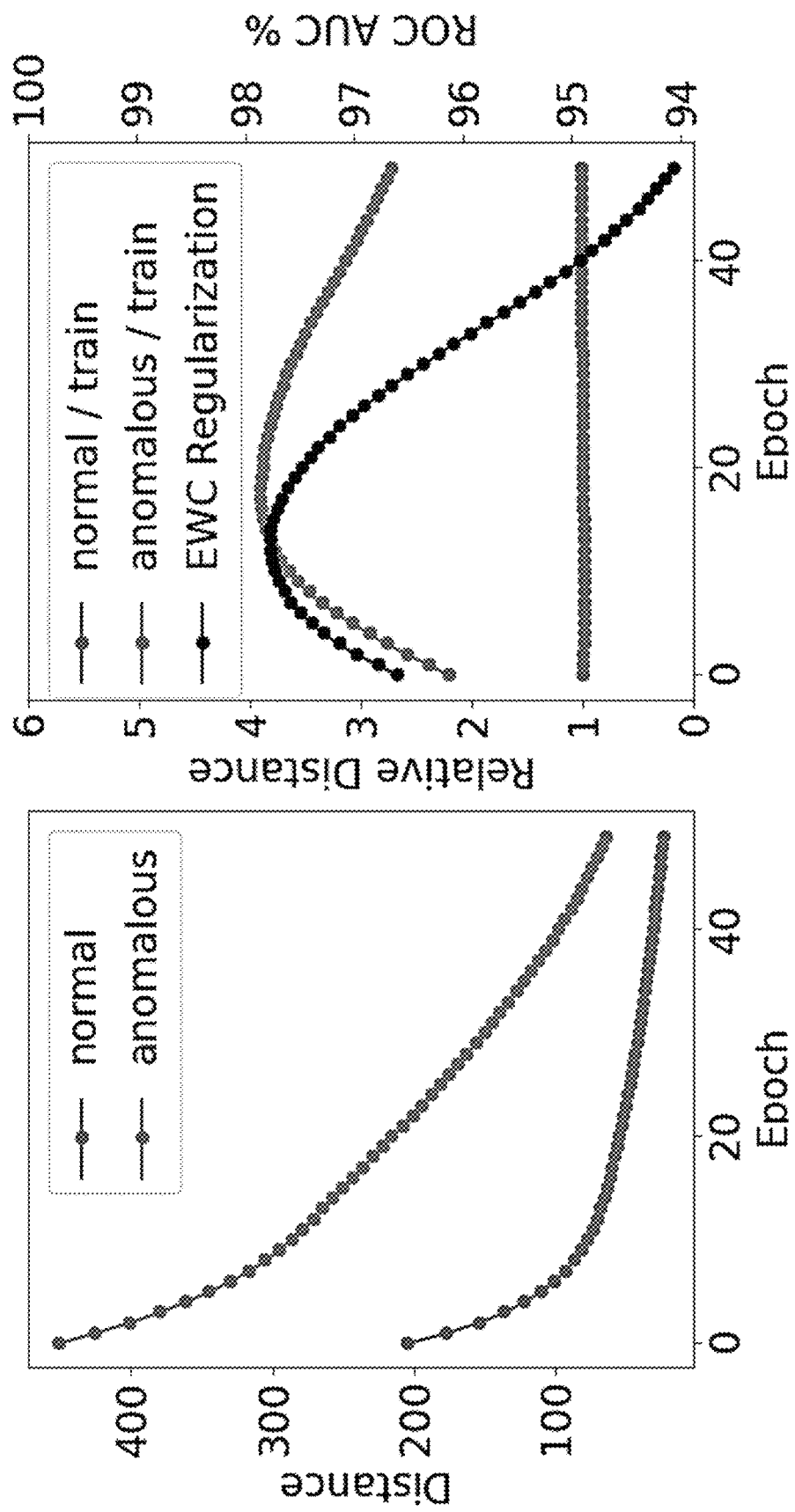
FIGS. 8A-8B illustrate anomaly detection accuracy as correlated to the ratio between the average compactness loss of test set anomalies and the average compactness loss of training set normal images, according to some embodiments of the present disclosure.
Figure 8B:
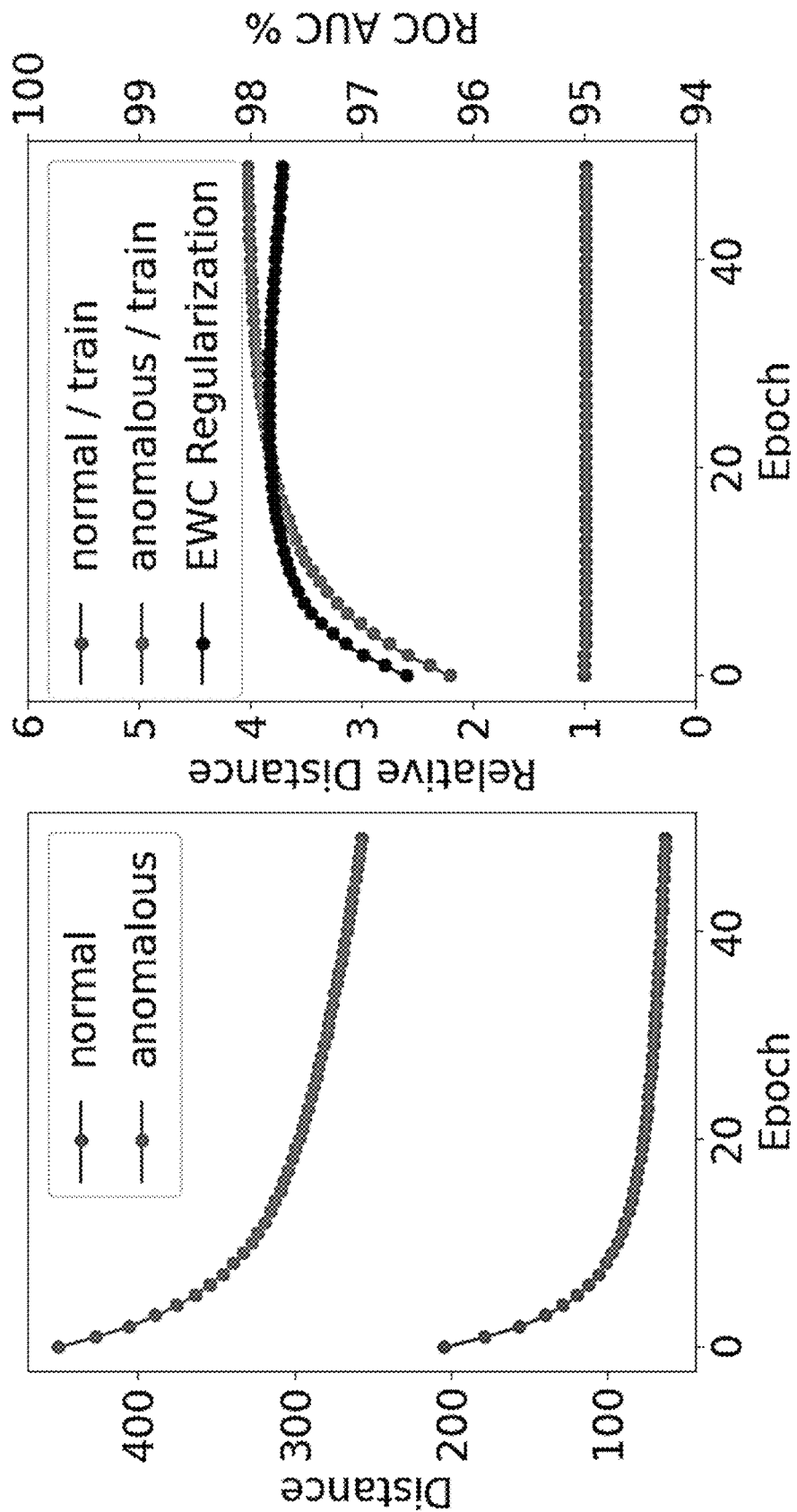

Sample-Wise Early Stopping (SES):

Early stopping is one of the simplest methods used to regularize neural network. While stopping the training process after constant number of iterations helps to control the collapse of the original features in most examined datasets, in other cases, collapse occurs earlier in the training process, thus the best number of early stopping iterations may vary between datasets. Accordingly, in some embodiments, the present disclosure provides for "samplewise early stopping" (SES). The intuition for the method can be obtained from FIGS. 8A-8B. As can be seen, anomaly detection accuracy is correlated to the ratio between the average compactness loss of test set anomalies and the average compactness loss of training set normal images. Accordingly, the present disclosure provides for saving checkpoints of the network at fixed intervals during the training process, e.g., corresponding to different early stopping iterations ($\psi_1, \psi_2 \ldots \psi_T$). Thus, for each network $\psi_t$, the average loss on the training set images $s_t$ is calculated. During inference, a target image x is scored using each model $\psi_t(x)=f_t$, and the score is normalized by the relevant average score $s_t$. The maximal normalized score is set as the anomaly score of this sample, as this roughly estimates the model that achieves the best separation between normal and anomalous samples. Note that each sample is scored using only its features $f_t$, and the normal train set average score $s_t$, without seeing the labels of any other test set samples.

Continual Learning (EWC)

In some embodiments, the present disclosure provides for a novel solution for overcoming premature feature collapse that draws inspiration from the field of continual learning. The task of continual learning tackles learning new tasks without forgetting the previously learned ones. It may be noted, however, that the present task is not identical to standard continual learning as (i) it deals with the one-class classification setting whereas continual-learning typically deals with multi-class classification, and (ii) it aims to avoid forgetting the expressivity of the features but do not particularly care if the actual classification performance on the old task is degraded. A simple solution for preventing feature collapse is by regularization of the change in value of the weights of the feature extractor $\psi$ from those of the pre-trained extractor $\psi_0$. However, this solution is lacking as the features are more sensitive to some weights than others and this can be "exploited" by the adaptation method.

Accordingly, in some embodiments, the present disclosure provides for using elastic weight consolidation (EWC). Using a number of mini-batches (e.g., 100 batches) of pretraining on the auxiliary task, the diagonal of the Fisher information matrix F is computed for all weight parameters of the network. Note that this only needs to happen once at the end of the pretraining stage and does not need to be repeated. The value of the Fisher matrix for diagonal element $\theta'$ is given by:

$$F_{\theta'} = \mathbb{E}_{(x,y) \in D_{pretrain}} \left[ \left( \frac{\partial}{\partial \theta} L_{pretrain}(x, y); \theta' \right)^2 \bigg| \theta \right] \quad (5)$$

The diagonal of the Fisher information matrix $F_{\theta_i}$ is used to weight the Euclidean distance of the change of each network parameter $\theta_i \in \psi_0$ and its corresponding parameter $\theta^*_i \in \psi$. This weighted distance can be interpreted as a measure of the curvature of the loss landscape as function of the parameters—larger values imply high curvature, inelastic weights. This regularization is used in combination with the compactness loss, the losses are weighted by the factor $\lambda$, which is a hyperparameter of the method (we always use $\lambda = 10^4$):

$$L_\theta = L_{compact}(\theta) + \frac{\lambda}{2} \cdot \sum_i F_{\theta_i}(\theta_i - \theta^*_i)^2 \quad (6)$$

Network $\psi$ is initialized with the parameters of the pretrained extractor $\psi_0$ and trained with SGD.

Anomaly Scoring

Given strong features and appropriate adaptation, the present transformed data typically follows the standard anomaly detection assumption, i.e., high-density in regions of normal data. As in classical anomaly detection, scoring can be done by density estimation. The present method performs better with strong non-parametric anomaly scoring methods. Several anomaly scoring methods can be evaluated: (i) Euclidean Distance to the mean of the training features, (ii) the K nearest-neighbor distance between the target (test set) features and the features of the training set images, and/or (iii) computing the K-means of the training set features, and computing the distance between the target sample features to the nearest mean.

Outlier Exposure

An extension of the typical image anomaly detection task assumes the existence of an auxiliary dataset of images $D_{OE}$, which are more similar to the anomalies than normal data. In case such information is available, a linear classification w layer may be trained together with the features $\psi$ under a logistic regression loss (Eq. 7). As before, $\psi$ is initialized with the weights from $\psi_0$. After training $\psi$ and w, $w \cdot \psi(x)$ may be used as the anomaly score.

$$L_{OE} = \Sigma_{x \in D_{train}} \log(\sigma(1 - w \cdot \psi(x))) + \Sigma_{x \in D_{OE}} \log(\sigma(w \cdot \psi(x))) \quad (7)$$

EXPERIMENTAL RESULTS—EWC

The present inventors have compared the EWC variant of the present method to One-class SVM (see Bernhard Scholkopf, et al. Support vector method for novelty detection. In NIPS, 2000), DeepSVDD, and Multi-Head RotNet. The present method is also comrade to raw (un-adapted) pretrained features. To investigate performance in domains significantly different from the dataset used to pretrain the features, the present evaluated the present method across a large range of datasets: standard datasets (CIFAR10/100, CatsVsDogs), Black-and-white dataset (Fashion MNIST), Small fine-grained datasets (Birds200/Oxford Flowers), Medical dataset (WBC), Very fine-grained anomalies (MVTec), and aerial images (DIOR). Table 7 below shows the results.

TABLE 7

Anomaly detection performance (Average ROC AUC %)

| | Self-Supervised | | | Pretrained | | Outlier Exposure | |
|---|---|---|---|---|---|---|---|
| | OC-SVM | DeepSVDD | MHRot | Unadapted | Present Method | MHRot | Present Method |
| CIFAR10 | 64.7 | 64.8 | 90.1 | 92.5 | 96.2 | 95.6 | 98.9 |
| CIFAR100 | 62.6 | 67.0 | 80.1 | 94.1 | 94.1 | — | 97.3 |
| FMNIST | 92.8 | 84.8 | 93.2 | 94.5 | 95.6 | — | 91.8 |
| CatsVsDogs | 51.7 | 50.5 | 86.0 | 96.0 | 97.3 | — | 94.5 |
| DIOR | 70.7 | 70.0 | 73.3 | 93.0 | 94.3 | — | 95.9 |

The main results show the: (i) pre-trained features achieve significantly better results than self-supervised features on all datasets; (ii) Feature adaptation significantly improves the performance on larger datasets; and (iii) outlier exposure (OE) can further improve performance in the case where the given outliers are more similar to the anomalies than the normal data. OE achieves near perfect performance on CIFAR10/100 but hurts performance for Fashion MNIST/CatsVsDogs which are less similar to the 80M Tiny images dataset.

Analysis and Further Evaluation

Tables 7 above and 8 below present a comparison between methods that use self-supervised and pre-trained feature representations. As can be seen, the autoencoder used by DeepSVDD is particularly poor. The results of the MHRot-Net as a feature extractor are better, but still underperform the present methods. The performance of the raw deep ResNet features without adaptation significantly outperforms all methods, including Fashion MNIST and DIOR which have significant differences from the ImageNet dataset. It may be therefore concluded that ImageNet-pretrained features typically have significant advantages over self-supervised features. Table 8 shows that self-supervised methods do not perform well on small datasets as such methods require large numbers of normal samples in order to learn strong features. On the other hand ImageNet-pretrained features obtain very strong results.

TABLE 8

Pretrained feature performance on various small datasets (Average ROC AUC %)

| | Self-Supervised | | | Pretrained |
|---|---|---|---|---|
| Dataset | OC-SVM | DeepSVDD | MHRot | Unadapted |
| Birds 200 | 62.0 | 60.8 | 64.4 | 95.3 |
| Flowers | 74.5 | 78.1 | 65.9 | 94.1 |
| MVTec | 70.8 | 77.9 | 65.5 | 86.5 |
| WBC | 75.4 | 71.2 | 57.7 | 87.4 |

The results in Table 7 on FMNIST, DIOR, WBC, MVTec suggest that pretrained features generalize to anomaly detection on domains far from the pretraining dataset. The ImageNet-pretrained features were evaluated on datasets of various sizes, domains, resolutions and symmetries. On all those datasets pretrained features outperformed other methods. These datasets include significantly different objects from those of ImageNet, but also fine-grained intra-object anomalies, and represent a spectrum of data types: aerial images, microscopy, industrial images. This shows that one of the main concerns of using pre-trained features, namely, generalizing to distant domains is not an issue in practice.

Typically, anomaly detection methods employ different levels of supervision. Within the one-class classification task, one may use outlier exposure (OE)—an external dataset (e.g. the ImageNet dataset), pretrained features, or no external supervision at all. The most extensive supervision is used by OE, which requires a large external dataset at training time, and performs well only when such a dataset is from a similar domain to the anomalies. In cases where the dataset used for OE has significantly different properties, the network may not learn to distinguish between normal and anomalous data, as the normal and anomalous data may have more in common than the OE dataset.

Pretraining, like Outlier Exposure, is also achieved through an external labelled dataset, but differently from OE, the external dataset is only required once—at the pretraining stage and is not used again. Additionally, the same features are applicable for very different image domains from that of the pretraining dataset. Self-supervised feature learning requires no external dataset at all, which can potentially be an advantage. While there might be image anomaly detection tasks where ImageNet-pretrained weights are not applicable, there was no evidence for such cases after examining a broad spectrum of domains and datasets. This indicates that the extra supervision of the ImageNet-pretrained weights comes at virtually no cost.

The present inventors did not find evidence that pretrained features improve the performance of RotNet-based AD methods. As can be seen in Table 9 below, pretrained features improve the auxiliary task performance on the normal data, but also on the anomalous samples. As such methods rely on a generalization gap between normal and anomalous samples, deep features actually reduce this gap, as a solution to the auxiliary task becomes feasible for both types of images.

TABLE 9

Comparison of average transformation prediction accuracy (%)

| Method | Normal | | | Anomalous | | |
|---|---|---|---|---|---|---|
| | Horizontal | Vertical | Rotation | Horizontal | Vertical | Rotation |
| Self-supervised | 94.0 | 91.4 | 94.0 | 67.9 | 67.5 | 51.6 |
| Pretrained | 94.4 | 94.4 | 92.3 | 71.4 | 69.9 | 61.3 |

Feature adaptation aims to make the distribution of the normal samples more compact, with respect to the anomalous samples. The present approach of finetuning pretrained features for compactness under EWC regularization, significantly improves the performance over "raw" pretrained features. While the distance from the normal train samples center, of both normal and anomalous test samples is reduced, the average distance from the center of anomalous test samples is typically further than that of normal samples, in relative terms. This makes anomalies easier to detect by standard classifiers such as kNN.

While the present method-EWC may train more than 7.8 k minibatches without catastrophic collapse on CIFAR10, performance of training without regularization usually peaks higher but collapse earlier. Therefore, the constant early stopping epoch was set such that the net trains with to 2.3 k minibatches on all datasets for comparison. The present method-SES usually achieves an anomaly score not far from the unregularized early stopping peak performance, but is most important in cases where unregularized training fails completely.

Table 10 below compares the present method against
Joint optimization (JO), co-training compactness with
  ImageNet classification which requires ImageNet data at training time. It can be seen that the present method-EWC always outperforms JO feature adaptation.
Early stopping (ImageNet pretraining+adaptation, with early stopping after constant iterations number), generally has higher performance than the present method-EWC, but has severe collapse issues on some classes.
Present method-SES is similar to early stopping, but the present method-SES does not collapse as badly on CatsVsDogs dataset. It is noted that weighting equally the changes in all parameters ($\Sigma_i(\theta_i - \theta^*_i)^2$) achieves similar results to early stopping.

TABLE 10

A comparison of different feature adaptation methods (Avg. ROC AUC %)

| | Baseline | The Present Method | | |
|---|---|---|---|---|
| Dataset | JO | Early stopping | SES | EWC |
| CIFAR10 | 93.2 | 96.2 | 95.9 | 96.2 |
| CIFAR100 | 91.1 | 94.8 | 94.6 | 94.2 |
| FMNIST | 94.9 | 95.4 | 95.5 | 95.6 |
| CatsVsDogs | 96.1 | 91.9 | 95.7 | 96.4 |
| DIOR | 93.1 | 95.4 | 95.6 | 95.5 |

Fine-tuning all the layers is prone to feature collapse, even with continual learning (see Table 11 below). Finetuning Blocks 3 & 4, or 2, 3 & 4, results in similar performance. Finetuning only block 4 results in a very similar performance to linear whitening of the features according to the train samples (94.6 with whitening vs. 94.8 with finetuning only the last block). Similar effect as can be seen in the original DeepSVDD architecture. Accordingly, it is recommended to finetune Blocks 3 & 4.

TABLE 11

Performance of finetuning different ResNet blocks (CIFAR10 w. EWC, ROC AUC %)

| Trained Blocks | 1, 2, 3, 4 | 2, 3, 4 | 3,4 | 4 |
|---|---|---|---|---|
| Average | 94.9 | 95.9 | 96.2 | 94.8 |

Anomaly Scoring Functions kNN achieves an improvement of around 2% on average with respect to distance to the center. A naive implementation of kNN has linear runtime complexity in the number of training samples. K-means with a small number of clusters gives ~1% decrease. It is noted that even for very large datasets, or many thousands of means, both kNN and K-means can run faster than real-time.

Sub-Image Anomaly Detection with Deep Pyramid Correspondences

Nearest neighbor (kNN) methods utilizing deep pretrained features exhibit very strong anomaly detection performance when applied to entire images, as described above.

However, a potential limitation of kNN methods is the lack of segmentation map describing where the anomaly lies inside the image.

Accordingly, in some embodiments, the present disclosure further provides for a novel anomaly segmentation approach based on alignment between the anomalous image and a constant number of the nearest normal images. The present method, termed Semantic Pyramid Anomaly Detection, uses correspondences based on a multi-resolution feature pyramid. The present method is shown to achieve state-of-the-art performance on unsupervised anomaly detection and localization while requiring virtually no training time.

A key human ability is to detect novel images that stand out in the succession of like images observed day-to-day, e.g., those images indicating opportunity or danger, that deviate from previous patterns. Such ability typically triggers particular vigilance on the part of the human agent. Due to the importance of this task, allowing computers to detect anomalies is a key task for artificial intelligence.

As a motivational example, let us consider assembly-line fault detection. Assembly lines manufacture many instances of a particular product. Most products are normal and fault-free. However, on occasion, the manufactured products contain some faults, e.g. dents, wrong labels or part duplication. As reputable manufacturers strive to keep a consistent quality of products, prompt detection of the faulty products is very valuable. As mentioned earlier, humans are quite adept at anomaly detection, however, having a human operator oversee every product manufactured by an assembly line has several key limitations, e.g., costs associated with employing skilled operators, difficulty to obtain and train skilled operators, limited human attention span, and difficulty to obtain consistent results over time and across various operators.

Although computer visual anomaly detection is very valuable, it is also quite challenging. One challenge common to all anomaly detection methods is the unexpectedness of anomalies. Typically, in supervised classification, test classes come from a similar distribution to the training data. In most anomaly detection settings, the distribution of anomalies is not observed during training time. Different anomaly detection methods differ by the way the anomalies are observed at training time. For example, in some cases, at training time only normal data is observed. This is a practically useful setting, as obtaining normal data (e.g., products that contain no faults) is relatively easy. This setting is sometimes called semi-supervised or normal-only training setting. An easier scenario is fully-supervised, i.e., both labelled normal and anomalous examples are presented during training.

Another challenge particular to visual anomaly detection (rather than non-image anomaly detection methods) is the localization of anomalies, i.e., segmenting the parts of the image which the algorithm deems anomalous. This is very important for explainability of the decision made by the algorithm, as well as for building trust between operators and novel AI systems. It is particularly important for anomaly detection, as the objective is to detect novel changes not seen before, and with which humans might not be familiar. In this case, the algorithm may teach the human operator of the existence of new anomalies or alternatively the human may decide that this anomaly is not of interest, thus not rejecting the product and resulting is cost-savings.

Accordingly, in some embodiments, the present disclosure provides for a novel method for solving the task of sub-image anomaly detection and segmentation. The present method does not require an extended training stage, it is fast, robust, and achieves state of the art performance. in some embodiments, the present method consists of several stage:

Image feature extraction using a pre-trained deep neural network (e.g., a ResNet pre-trained on the ImageNet dataset, http://www.image-net.org/), nearest neighbor retrieval of the nearest K normal images to a target data sample, finding dense pixel-level correspondence between the target data sample and the nearest neighbor normal images, and identification of target image regions that do not have near matches in the retrieved normal images as anomalous.

In some embodiments, the present disclosure computes sub-image feature representations for each image in a set of normal images and for a given target image. A sub-image feature representations may consist of a set of features, each feature may give a description of the image around some image location. One example of a set of locations can be the centers of each pixel.

In some embodiments, the present disclosure classifies a target location within the target image as normal or anomalous, given the similarity of its feature representation to that of other sub-image feature representations. In some embodiments, the present disclosure may use one or more suitable classifier to perform this task, e.g., K-nearest neighbors (kNN), K means, OCSVM, SVDD, neural network, and the like.

In some embodiments, the classifier may search for the nearest features to the target feature within the sub-image feature representation of the normal images and/or within the sub-image feature representation of the target image. Locations with distances to the nearest features larger than a pre-specified threshold may be classified as anomalous. In some embodiments, such distance measures may include the Euclidean distance.

In some embodiments, features may be extracted by any suitable method, e.g., a deep neural network (pre-trained or otherwise); a hand-crafted pipeline (e.g., HOG, color histograms, image location); and/or using the raw data itself. In some embodiments, neural network activations extracted at multiple resolutions (feature pyramid) may be used. In some embodiments, a dense sub-image feature representations of uniform resolution may be formed using upscaling of the activations of the different resolutions within a neural network to that of the highest resolution. The highest resolution can be the same as the input resolution or some intermediate layer.

In some embodiments, training data may comprise normal-only images. In some embodiments, if some of the images in a training dataset are anomalous, a method for detecting the whole normal images may be first performed (e.g., the whole image anomaly detection method disclosed hereinabove). In some embodiments, the training dataset may be pruned by selecting the images that are most similar to the target image, e.g., as measured using, e.g., a global deep feature representation.

In some embodiments, the present method may also be applied to video. Thus, a target frame sequence within a video segment may be as the target segment. Wherein other frame sequences in the video segment may be treated as the normal segments. The kNN classification can be performed similarly to the above. In some embodiments, obtaining features for video may be performed using any suitable method, e.g., extraction by a deep neural network (pre-trained or otherwise), wherein the network may take in single or multiple frame inputs; a hand-crafted pipeline (e.g., HOG, color histograms, clip time or location); and/or the raw data itself. It is possible to use neural network activations extracted at multiple resolutions (feature pyramid). One way of forming a dense sub-image feature representations of uniform resolution is upscaling the activations of the different resolutions to that of the highest resolution. The highest resolution can be the same as the input resolution or some intermediate layer. This can also be performed in the temporal domain. In some embodiments, for the normal video segments, the entire video training set or a part of it may be selected. If some of the segments given for training are anomalous, a method for detecting the normal segments can be first performed.

The present disclosure is more accurate, faster, and more stable than previous methods, and does not require a dedicated training stage. The present inventors have evaluated the present method on two high quality datasets for evaluating sub-image anomaly detection task:

- MVTec (Bergmann, P. et al. MVTec ad-a comprehensive real-world dataset for unsupervised anomaly detection. In: CVPR (2019): A dataset simulating an industrial fault detection where the objective is to detect parts of images a products that contain faults such as dents or missing parts
- The ShanghaiTech Campus dataset (STC, Luo, W. et al. A revisit of sparse coding based anomaly detection in stacked RNN framework. In: ICCV (2017)): Simulates a surveillance setting where camera observe a busy campus and the objective is to detect anomalous objects and activities such as fights.

Correspondence-Based Sub-Image Anomaly Detection

The first stage of the present method is the extraction of strong image level features. The same features are later used for pixel-level image alignment. There are multiple options for extracting features. The most commonly used option is self-supervised feature learning, that is, learning features from scratch directly on the input normal images. Although it is an attractive option, it is not obvious that the features learned on small training datasets will indeed be sufficient for serving as high-quality similarity measures. Accordingly, in some embodiments, the present disclosure employs a ResNet feature extractor pre-trained on the ImageNet dataset. As image-level features the present disclosure uses the feature vector obtained after global-pooling the last convolutional layer. The global feature extractor may be denoted F, wherein for a given image $x_i$, the extracted features are denoted $f_i$:

$$f_i = F(x_i) \quad (8)$$

At initialization, the features for all training images (which are all normal) are computed and stored. At inference, only the features of the target image are extracted.

The first stage in the present method is determining which images contain anomalies using, e.g., the whole-image anomaly detection method disclosed herein above. For a given test image y, its K nearest normal images are retrieved from the training set, $N_k(f_y)$. The distance is measured using the Euclidean metric between the image-level feature representations.

$$d(y) = \frac{1}{k} \sum_{f \in N_k(f_y)} \|f - f_y\|^2 \quad (9)$$

Target image y is labelled at this stage as normal or anomalous. Positive classification is determined by verifying if the kNN distance is larger than a threshold τ. Is classified as anomalous, target image y is further processed in order to determine the sub-image anomaly locations.

Next, a sub-image anomaly detection via image alignment stage is performed. The input to this stage is target image y that was classified as anomalous on a whole-image basis. The objective is to locate and segment the pixels of one or multiple anomalies within the target image y. In the case that the target image y was falsely classified as anomalous, the present method would mark no pixels as anomalous.

In some embodiments, the present disclosure provides for aligning the target image y to multiple retrieved normal images. In some embodiments, the present disclosure extracts deep features at every pixel location p∈P using feature extractor $F_L(x_i,p)$ of the relevant target image y and retrieved normal training images. A gallery of features is constricted comprising all pixel locations of the K nearest neighbors $G=\{F_L(x_1,p)|p\in P\}\cup\{F_L(x_2,p)|p\in P\}\} \ldots \cup\{F_L(x_K,p)|p\in P\}\}$. The anomaly score of pixel p in target image y is therefore given by:

$$d(y, p) = \frac{1}{k} \sum_{f \in N_k(p, F_L(y,P))} \|f - F_L(y, P)\|^2 \quad (10)$$

For a given threshold $\theta_p$, a pixel is determined as anomalous if $d(y,p) > \theta_p$, that is, if no closely corresponding pixel in the K nearest neighbor normal images may be found.

Alignment by dense correspondences is an effective way of determining the parts of the image that are normal vs. those that are anomalous. In order to perform the alignment effectively, it is necessary to determine the features for matching. As in the previous stage, the present method uses features from a pre-trained ResNet deep CNN. The ResNet results in a pyramid of features. Similarly to image pyramid, earlier layers (levels) result is higher resolution features encoding less context. Later layers encode lower resolution features which encode more context but at lower spatial resolution. To perform effective alignment, each location is described using features from the different levels of the feature pyramid. Specifically, features from the output of the last M blocks are concatenated. The features thus encode both fine-grained local features and global context. This allows the present method to find correspondence between the target image y and K>1 normal images, rather than having to explicitly align the images, which is more technically challenging and less robust.

Figure 9A:
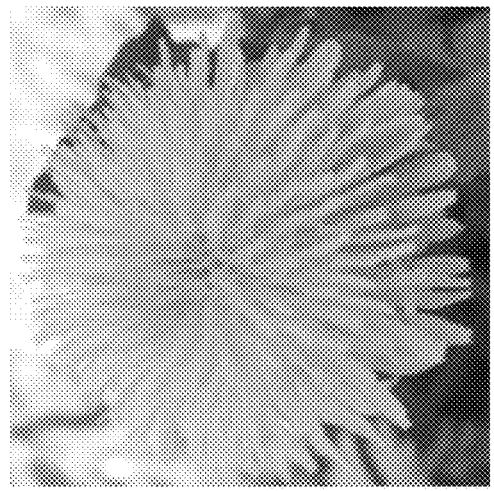
FIGS. 9A-9C show an evaluation of the present method on detecting anomalies between flowers with or without insects, and bird varieties, according to some embodiments of the present disclosure.
Figure 9A:
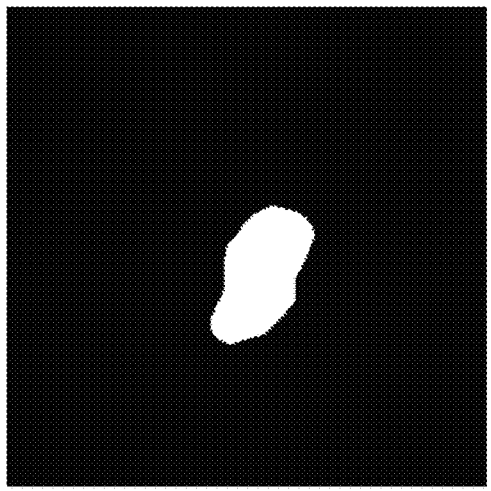
Figure 9A:
Figure 9A:
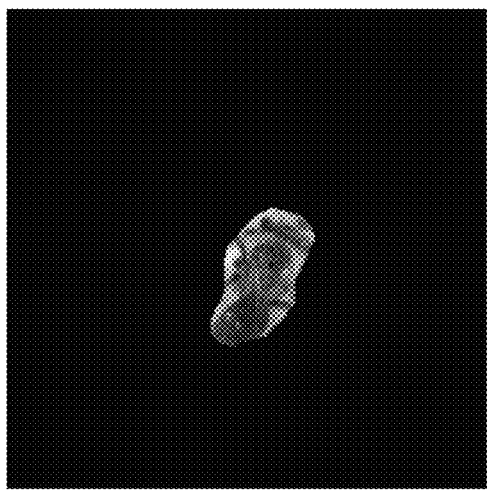
Figure 9B:
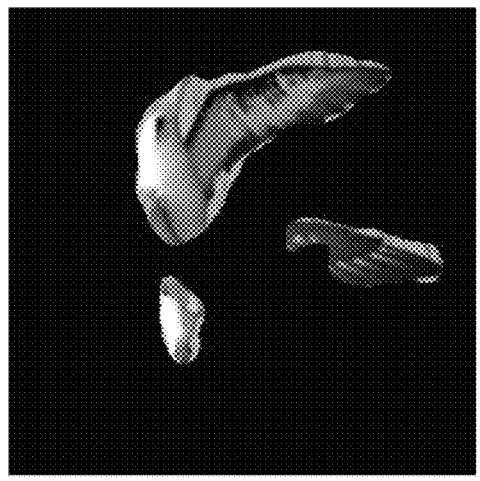
Figure 9B:
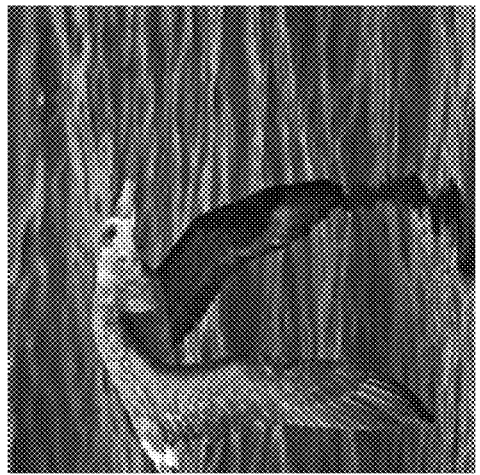
Figure 9B:
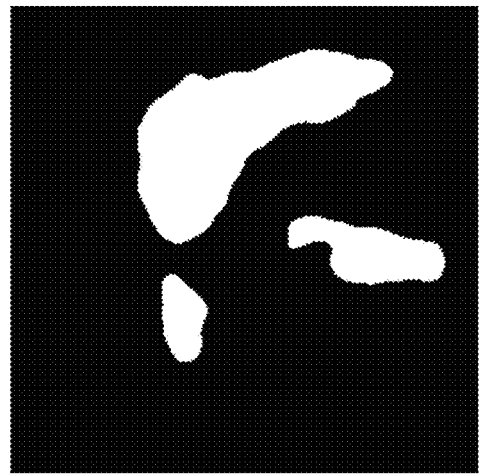
Figure 9B:
Figure 9C:
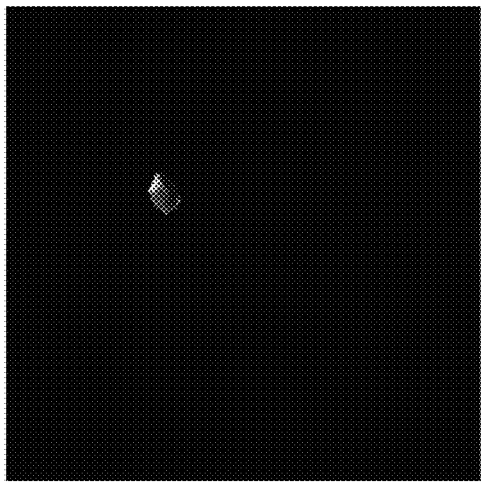
Figure 9C:
Figure 9C:
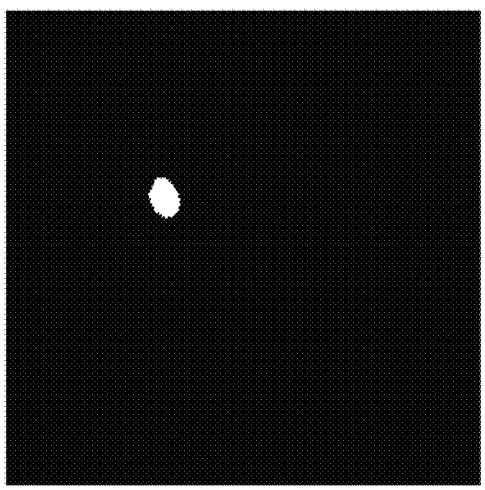
Figure 9C:

FIGS. 9A-9B show an evaluation of the present method on detecting anomalies between flowers with or without insects, and bird varieties. FIGS. 9A-9B shows an anomalous image (A), the retrieved top normal neighbor image (B), the mask detected by the present method (C), and the predicted anomalous image pixels (D). FIG. 9C shows a red spot of an anomalous woodpecker (A), the retrieved top normal neighbor image (B), the mask detected by the present method (C), and the predicted anomalous image pixels (D).

EXPERIMENTAL RESULTS

The present inventors conducted an evaluation of the present method against the state-of-the-art in sub-image anomaly detection.

The experiments used a Wide-ResNet50×2 feature extractor, which was pre-trained on the ImageNet dataset (http://www.image-net.org/). MVTec images were resized to 256×256 and cropped to 224×224. ShanghaiTech Campus dataset (STC) images were resized to 256×256 using cv2.INTERAREA. Due to the large size of STC, the data samples were subsampled by a factor of 5 to roughly 5000 images. All metrics were calculated at 256×256 image resolution. The features from the ResNet were obtained at the end of the first block (56×56), second block (28×28) and third layer (14×14), all with equal weights. K=50 nearest neighbor was used for the MVTec experiments, and K=1 nearest neighbor for the STC experiments (due to the larger dataset size). After achieving the pixel-wise anomaly score for each images, skimage Gaussian filter was used with sigma=4.

A first set of experiments was conducted on the MVTec dataset, which comprises images from 15 different classes. Five classes consist of textures such as wood or leather. The other 10 classes contain objects (mostly rigid). For each class, the training set is composed of normal images. The test set is composed of normal images as well as images containing different types of anomalies. This dataset therefore follows the standard protocol where no anomalous images are used in training. The anomalies in this dataset are more fine-grained than those typically used in the literature, e.g., in CIFAR10 evaluation, where anomalous images come from a completely different image category. Instead, anomalies in MVTec take the form of, e.g., a slightly scratched object or a lightly deformed (e.g., bent) object. As the anomalies are at the sub-image level, i.e., only affect a part of the image, the dataset provides segmentation maps indicating the precise pixel positions of the anomalous regions.

Figure 10:
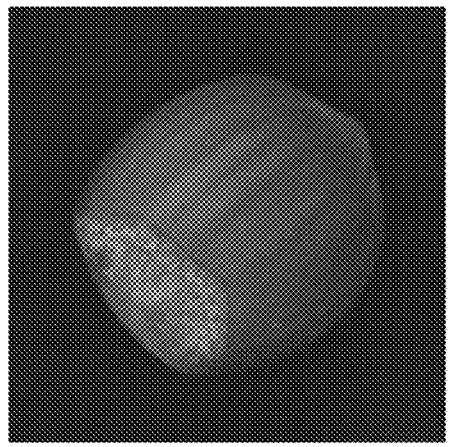
FIG. 10 shows an anomalous image (a hazelnut which contains a scratched area) (A), the retrieved nearest neighbor normal image, which contains a complete nut without scratches, the mask detected by the present method (C), and the predicted anomalous image pixels (D)
Figure 10:
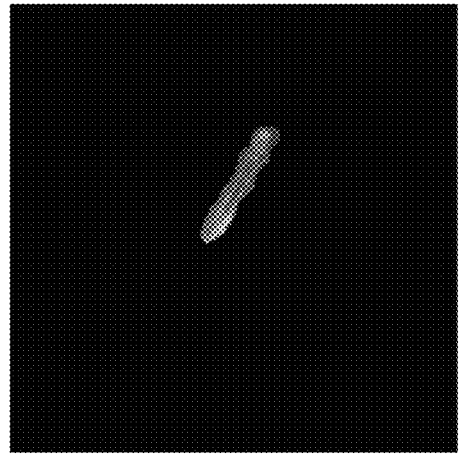
Figure 10:
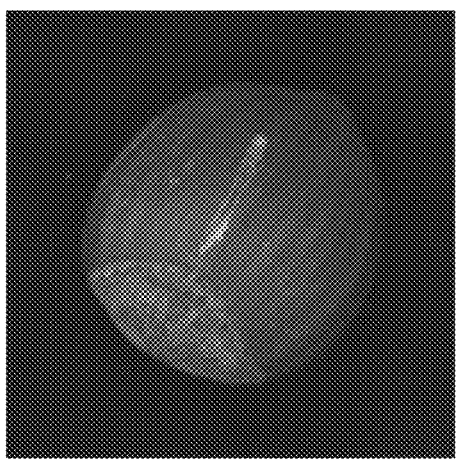
Figure 10:
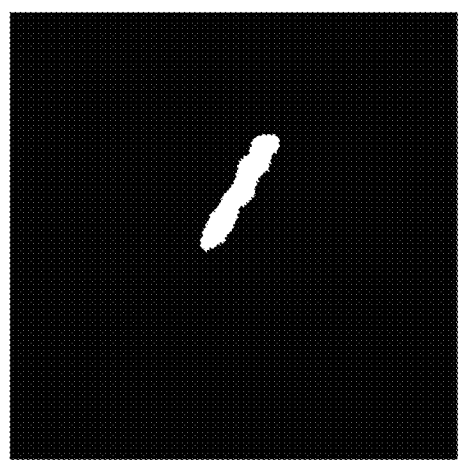

An example of the operation of the present method on the MVTec dataset can be observed in FIG. 10, which shows an anomalous image (a hazelnut which contains a scratched area) (A), the retrieved nearest neighbor normal image, which contains a complete nut without scratches, the mask detected by the present method (C), and the predicted anomalous image pixels (D).

By searching for correspondences between the two images, the present method is able to find correspondences for the normal image regions but not for the anomalous region. This results in an accurate detection of the anomalous image region.

The present method was compared against several methods that were introduced over the last several months, as well as longer standing baseline such as OCSVM and nearest neighbors. For each setting, the present method was compared against the methods that reported the suitable metric.

First, the quality of deep nearest neighbor matching was evaluated as a means for finding anomalous images. This is computed by the distance between the test image and the K nearest neighbor normal images. Larger distances indicate more anomalous images. The ROC area under the curve (ROCAUC) of the present method and other state-of-the-art methods are compared and the average ROCAUC across the 15 classes is reported in Table 12 below. This comparison is important as it verifies whether deep nearest neighbors are effective on these datasets. The present method is shown to outperform a range of state-of-the-art methods utilizing a range of self-supervised anomaly detection learning techniques. This gives evidence that deep features trained on the ImageNet dataset (which is very different from MVTec) are very effective even on such a distant dataset.

TABLE 12

Image-level Anomaly Detection Accuracy on MVTec (Average ROCAUC %)

|  | Geom | GANomaly | $AE_{L2}$ | ITAE | The Present Method |
|---|---|---|---|---|---|
| Average | 67.2 | 76.2 | 75.4 | 83.9 | 85.5 |

The present method was then evaluated on the task of pixel-level anomaly detection. The objective here is to segment the particular pixels that contain anomalies. The present method was evaluated using two established metrics. The first is per-pixel ROCAUC. This metric is calculated by scoring each pixel by the distance to its K nearest correspondences. By scanning over the range of thresholds, the pixel-level ROCAUC curve can be computed. The anomalous category is designated as positive. It was noted by several previous works that ROCAUC is biased in favor of large anomalies. In order to reduce this bias, the PRO (per-region overlap) curve metric was previously proposed, which first separates anomaly masks into their connected components, thereby dividing them into individual anomaly regions. By changing the detection threshold, the calculation scans over false positive rates (FPR), and for each FPR, PRO is computed, i.e., the proportion of the pixels of each region that are detected as anomalous. The PRO score at this FPR is the average coverage across all regions. The PRO curve metric computes the integral across FPR rates from 0 to 0.3. The PRO score is the normalized value of this integral.

Table 13 compares the present methods on the per-pixel ROCAUC metric against results reported by Bergmann et al. (Bergmann, P., et al. MVTec ad-a comprehensive real-world dataset for unsupervised anomaly detection. In: Proceedings of the IEEE Conference on Computer Vision and Pattern Recognition. pp. 9592-9600 (2019)), as well as newer results by Venkataramanan et al. (CAVGA-$R_U$, see Venkataramanan, S. et al. Attention guided anomaly detection and localization in images. arXiv preprint arXiv:1911.08616 (2019)). Most of the methods use different varieties of autoencoders, including the top-performer CAVGA-$R_u$. The present method significantly outperforms all methods. This attest to the strength of the present method pyramid based correspondence approach.

TABLE 13

Subpixel Anomaly Detection Accuracy on MVTec (ROCAUC %)

|  | $AE_{SSIM}$ | $AE_{L2}$ | AnoGAN | CNN Dict | TI | VM | CAVGA-$R_u$ | The Present Method |
|---|---|---|---|---|---|---|---|---|
| Carpet | 87 | 59 | 54 | 72 | 88 | — | — | 97.5 |
| Grid | 94 | 90 | 58 | 59 | 72 | — | — | 93.7 |
| Leather | 78 | 75 | 64 | 87 | 97 | — | — | 97.6 |
| Tile | 59 | 51 | 50 | 93 | 41 | — | — | 87.4 |
| Wood | 73 | 73 | 62 | 91 | 78 | — | — | 88.5 |
| Bottle | 93 | 86 | 86 | 78 | — | 82 | — | 98.4 |
| Cable | 82 | 86 | 78 | 79 | — | — | — | 97.2 |
| Capsule | 94 | 88 | 84 | 84 | — | 76 | — | 99.0 |
| Hazelnut | 97 | 95 | 87 | 72 | — | — | — | 99.1 |

TABLE 13-continued

Subpixel Anomaly Detection Accuracy on MVTec (ROCAUC %)

|  | $AE_{SSIM}$ | $AE_{L2}$ | AnoGAN | CNN Dict | TI | VM | CAVGA-$R_u$ | The Present Method |
|---|---|---|---|---|---|---|---|---|
| Metal nut | 89 | 86 | 76 | 82 | — | 60 | — | 98.1 |
| Pill | 91 | 85 | 87 | 68 | — | 83 | — | 96.5 |
| Screw | 96 | 96 | 80 | 87 | — | 94 | — | 98.9 |
| Toothbrush | 92 | 93 | 90 | 77 | — | 68 | — | 97.9 |
| Transistor | 90 | 86 | 80 | 66 | — | — | — | 94.1 |
| Zipper | 88 | 77 | 78 | 76 | — | — | — | 96.5 |
| Average | 87 | 82 | 74 | 78 | 75 | 77 | 89 | 96.5 |

Table 14 compares the present method in terms of PRO. As explained above, this is another per-pixel accuracy measure which gives larger weight to anomalies which cover few pixels.

TABLE 14

Subpixel Anomaly Detection Accuracy on MVTec (PRO %)

|  | Student | 1-NN | OC-SVM | $\ell_2$-AE | VAE | SSIM-AE | CNN-Dict | the present method |
|---|---|---|---|---|---|---|---|---|
| Carpet | 69.5 | 51.2 | 35.5 | 45.6 | 50.1 | 64.7 | 46.9 | 94.7 |
| Grid | 81.9 | 22.8 | 12.5 | 58.2 | 22.4 | 84.9 | 18.3 | 86.7 |
| Leather | 81.9 | 44.6 | 30.6 | 81.9 | 63.5 | 56.1 | 64.1 | 97.2 |
| Tile | 91.2 | 82.2 | 72.2 | 89.7 | 87.0 | 17.5 | 79.7 | 75.9 |
| Wood | 72.5 | 50.2 | 33.6 | 72.7 | 62.8 | 60.5 | 62.1 | 87.4 |
| Bottle | 91.8 | 89.8 | 85.0 | 91.0 | 89.7 | 83.4 | 74.2 | 95.5 |
| Cable | 86.5 | 80.6 | 43.1 | 82.5 | 65.4 | 47.8 | 55.8 | 90.9 |
| Capsule | 91.6 | 63.1 | 55.4 | 86.2 | 52.6 | 86.0 | 30.6 | 93.7 |
| Hazelnut | 93.7 | 86.1 | 61.6 | 91.7 | 87.8 | 91.6 | 84.4 | 95.4 |
| Metal nut | 89.5 | 70.5 | 31.9 | 83.0 | 57.6 | 60.3 | 35.8 | 94.4 |
| Pill | 93.5 | 72.5 | 54.4 | 89.3 | 76.9 | 83.0 | 46.0 | 94.6 |
| Screw | 92.8 | 60.4 | 64.4 | 75.4 | 55.9 | 88.7 | 27.7 | 96.0 |
| Toothbrush | 86.3 | 67.5 | 53.8 | 82.2 | 69.3 | 78.4 | 15.1 | 93.5 |
| Transistor | 70.1 | 68.0 | 49.6 | 72.8 | 62.6 | 72.5 | 62.8 | 87.4 |
| Zipper | 93.3 | 51.2 | 35.5 | 83.9 | 54.9 | 66.5 | 70.3 | 92.6 |
| Average | 85.7 | 64 | 47.9 | 79 | 63.9 | 69.4 | 51.5 | 91.7 |

A further set of experiments was conducted with respect to the Shanghai Tech Campus (STC) Dataset. STC simulates a surveillance setting, where the input consists of videos captured by surveillance cameras observing a busy campus. The dataset contains 12 scenes, each scene consists of training videos and a smaller number of test images. The training videos do not contain anomalies while the test images contain normal and anomalous images. Anomalies are defined as pedestrians performing non-standard activities (e.g. fighting) as well as any moving object which is not a pedestrian (e.g. motorbikes).

The present method was evaluated at a first stage for detecting image-level anomalies against other state-of-the-art methods. The pixel-level ROCAUC performance was then compared with the best reported method, CAVGA-$R_u$. The present method significantly outperforms the best reported method by a significant margin. The results are reported in Tables 15 and 16 below.

TABLE 15

Image-level Anomaly Detection Accuracy on STC (Average ROCAUC %)

| TSC | StackRNN | AE-Conv3D | MemAE | AE(2D) | ITAE | The Present Method |
|---|---|---|---|---|---|---|
| 67.9 | 68.0 | 69.7 | 71.2 | 60.9 | 72.5 | 71.9 |

TSC: Luo, W., et al. A revisit of sparse coding based anomaly detection in stacked RNN framework. In: Proceedings of the IEEE International Conference on Computer Vision. pp. 341{349 (2017).
StackRNN: Luo, W., et al. A revisit of sparse coding based anomaly detection in stacked RNN framework. In: Proceedings of the IEEE International Conference on Computer Vision. pp. 341{349 (2017)
AE-Conv3D: Zhao, Y., et al. Spatio-temporal autoencoder for video anomaly detection. In: Proceedings of the 25th ACM international conference on Multimedia. pp. 1933{1941 (2017).
MemAE: Gong, D., et al. Memorizing normality to detect anomaly: Memory-augmented deep autoencoder for unsupervised anomaly detection. In: Proceedings of the IEEE International Conference on Computer Vision. pp. 1705{1714 (2019).
AE(2D): Hasan, M., et al. Learning temporal regularity in video sequences. In: Proceedings of the IEEE conference on computer vision and pattern recognition. pp. 733{742 (2016).
ITAE: Huang, C., Cao, et al. Inverse-transform autoencoder for anomaly detection. arXiv preprint arXiv: 1911.10676 (2019)

TABLE 16

Pixel-level Anomaly Detection Accuracy on STC (Average ROCAUC %)

| $AE_{L2}$ | $AE_{SSIM}$ | CAVGA-$R_u$ | The Present Method |
|---|---|---|---|
| 74 | 76 | 85 | 89.9 |

The present inventors further conducted an ablation study on the present method in order to understand the relative performance of its different parts. Table 17 compares using different level of the feature pyramid. As can be observed, using too low a level by itself (56×56) significantly hurts performance while using the higher levels on their own results in diminished performance due to lower resolution. Using a combination of all features in the pyramid results in the best performance. Table 18 compares using the top K neighboring normal images as performed by the present method first stage vs. choosing them randomly from the dataset. It is observed that choosing the kNN images improves performance. This does not affect all classes equally. As an example, the numbers for "Grid" which has much variation between images are reported. For this category, using the kNN images results in much better performance than randomly choosing K images.

TABLE 17

Pyramid level ablation for Subpixel Anomaly Detection Accuracy on MVTec (PRO %)

| Used layers size: | (14) | (28) | (56) | The Present Method |
|---|---|---|---|---|
| Carpet | 93.5 | 93.4 | 91.0 | 94.7 |
| Grid | 80.9 | 88.0 | 89.1 | 86.7 |
| Leather | 96.6 | 97.5 | 97.3 | 97.2 |
| Tile | 74.5 | 65.9 | 73.8 | 75.9 |
| Wood | 84.7 | 87.7 | 87.5 | 87.4 |
| Bottle | 93.7 | 94.7 | 88.3 | 95.5 |
| Cable | 89.3 | 87.3 | 73.5 | 90.9 |
| Capsule | 90.5 | 92.8 | 91.4 | 93.7 |
| Hazelnut | 92.7 | 95.8 | 96.2 | 95.4 |
| Metal nut | 91.3 | 93.1 | 86.1 | 94.4 |
| Pill | 89.2 | 94.4 | 96.3 | 94.6 |
| Screw | 90.7 | 95.9 | 96.1 | 96.0 |
| Toothbrush | 90.9 | 93.5 | 94.5 | 93.5 |
| Transistor | 91.3 | 72.1 | 62.5 | 87.4 |
| Zipper | 90.9 | 92.4 | 92.5 | 92.6 |
| Average | 89.38 | 89.6 | 87.74 | 91.7 |

TABLE 18

Evaluating the effectiveness of the present method kNN retrieval state

| | Stage 1: | |
|---|---|---|
| | The Present Method (10 Random) | The Present Method (10NN) |
| Grid | 73.2 | 86.3 |
| Average | 89.2 | 91.4 |

In Table 18, 10 nearest neighbor methods are used, chosen according to stage 1, or randomly selected.

In some embodiments, the present method does not require feature training and can work on very small datasets. A difference between the present method and standard image alignment is that the present method finds correspondences between the target image and K normal images, as opposed to a single normal image in simple alignment approaches. In some embodiments, the quality of the alignment or correspondence between the anomalous image and retrieved normal images is strongly affected by the quality of extracted features, wherein context is very important. Local context is needed for achieving segmentation maps with high-pixel resolutions. Such features may be generally found in the shallow layers of a deep neural networks. Local context is typically insufficient for alignment without understanding the global context, i.e., where in the object does the part lie. Global context is generally found in the deepest layers of a neural network, however global context features are of low resolution. The combination of feature from different levels allows both global context and local resolution giving high quality correspondences.

In some embodiments, the present method is significantly reliant on the K nearest neighbors algorithm. The complexity of kNN scales linearly with the size of the dataset used for search which can be an issue when the dataset is very large or of high dimensionality. The present method approach is designed to mitigate the complexity issues. First, the initial image-level anomaly classification is computed on global-pooled features which are 2048 dimensional vectors. Such kNN computation can be achieved very quickly for moderate sized datasets and different speedup techniques (e.g. KDTrees) can be used for large scale datasets. The anomaly segmentation stage requires pixel-level kNN computation which is significantly slower than image-level kNN. However, the present method limits the sub-image kNN search to only the K nearest neighbors of the anomalous image, thus significantly limiting computation time. It is assumed that the vast majority of images are normal, therefore only a small fraction of images require the next stage of anomaly segmentation. The present method is therefore quite suitable for practical deployment from a complexity and runtime perspective.

Previous sub-image anomaly detection methods have either used self-learned features or a combination of self-learned and pre-trained images features. Self-learned approaches in this context, typically train an autoencoder and use its reconstruction error for anomaly detection. Other approaches have used a combination of pre-trained and self-learned methods. The present method numerical results have shown that the present method significantly outperforms such approaches. It is believed that given the limited supervision and small dataset size in normal-only training set as tackled in this work, it is rather hard to beat very deep pre-trained networks. Therefore, pre-trained features are used, without modification. The strong results achieved by the present method attest to the effectiveness of this approach.

Transformer-Based Anomaly Segmentation

In some embodiments, the present disclosure presents new anomaly segmentation methods based on transferring pretrained features.

In some embodiments, the present disclosure provides for a baseline method that outperforms all previous anomaly segmentation methods on the MVTec dataset. The approach represents images using ImageNet-pretrained convolutional feature pyramids. Target image pixels are classified using multi-scale nearest neighbor retrieval, wherein large distances correspond to anomalous pixels.

In some embodiments, the present disclosure further provides for fully exploiting contextual information from the whole image, based on the vision transformer (ViT), a recently introduced attentional-approach. it is found that the ViT architecture learns patch embedding that encode global context well. As the resolution of ViT is limited, the present disclosure improves it by combining it in a multi-resolution construction—which significantly improve performance and enjoys strong local and global context.

In some embodiments, the present method is based on retrieval of contextual features for detecting anomalies. In some embodiments, the present method uses standard feature extraction using a pre-trained ResNet. In some embodiments, using CNN-based methods involves issues associated with non-adaptive contexts which include areas of the image that make it hard to find similar normal contexts. In some embodiments, the present disclosure provides for using attentional mechanisms that learn the relevant context.

In some embodiments, the present disclosure provides for a simple baseline method for anomaly segmentation. The method consists of two stages:

Feature extraction: Extracting a feature descriptor for each pixel, combining the activations of one or more layers of a convolutional deep network.

Similarity estimation: Calculating the similarity of the descriptor of each pixel to the closest descriptor found in the train set.

Feature extraction may be performed to extract features $f_p$ for every pixel p in the image x using a pre-trained feature extractor $\phi$.

$$f_p = \phi(x,p) \quad (11)$$

In some embodiments, the activations of a deep ResNet pre-trained on the ImageNet dataset may be used. To extract deep features $f_p$, a pre-trained deep neural network is applied on each of the training images x, to extract the feature activations at a particular layer l at position p. Note that in this setting, all the training images are normal. All the features in a gallery G. Optionally, the number of stored features may be reduced by K-means, and only store the K means themselves. For the target image, features are extracted from each of its pixels in an identical way.

In some embodiments, the present disclosure then proceeds to estimate the similarity of the features extracted from the training images and the target image. The features of each of the pixels of the target pixels $f_p^{target}$ are compared with each of the features in the gallery G (which have been potentially reduced to the K means). The similarity is scored using the sum of the $L_2$ distance to the K nearest features:

$$d(f_p^{target}) = \frac{1}{k} \sum_{g \in N_K(f_p^{target}, G)} \|g - f_p^{target}\|^2 \quad (12)$$

where $N_K(f_p, G)$ indicates the K nearest neighbors in the gallery G to the target feature $f_p^{target}$.

In some embodiments, by comparing the distance $d(f_p^{target})$ with some threshold $\tau$, which is a hyperparameter of the method, the pixel p in the target image is classified as normal or anomalous. In some embodiments, threshold invariant metrics such as ROCAUC may be used rather than a threshold.

In convolutional neural networks (CNNs), lower layers result in higher resolution features encoding less context. Deeper layers extract features which encode more context but at lower spatial resolution. The feature extractor that outputs the activations of layer l may be denoted as $\phi_l$. In some embodiments, the present disclosure describes each pixel by combining the levels of the feature pyramid. Although typically the features from different layers of the pyramid are concatenated, the present disclosure instead computes the score of each pixel using each feature layer individually $d(f_p^l)$, and combine the scores to obtain a total multi-layer score: $s = \sum_{l=1}^{L} d(f_p^l)$.

Transformer-Based Anomaly Segmentation

Figure 11:
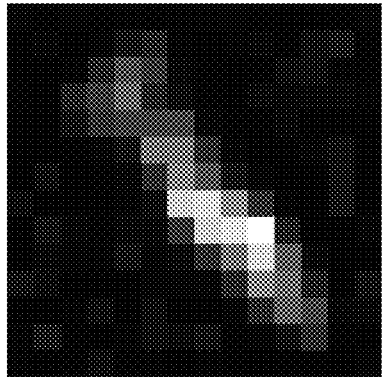
FIG. 11 shows an example of the effective contexts of CNNs and transformers, and the anomaly segmentation results on an anomalous image from MVTec Screw class, according to some embodiments of the present disclosure.
Figure 11:
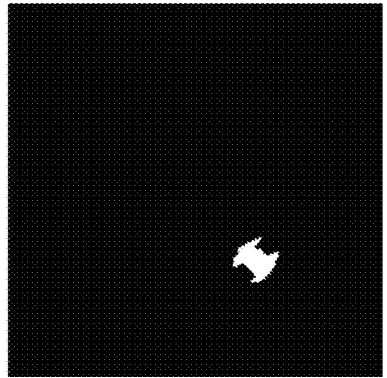
Figure 11:
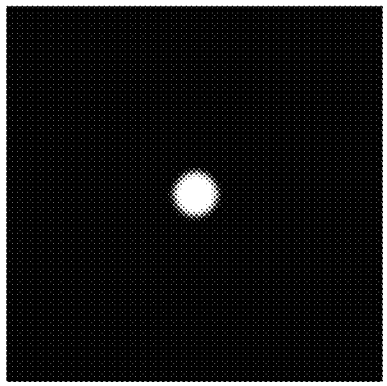
Figure 11:
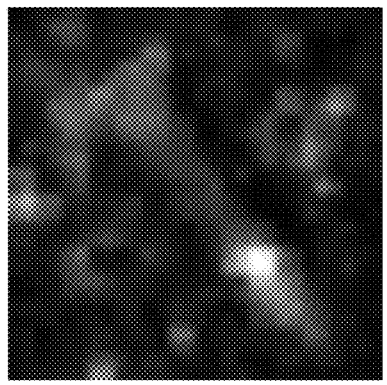
Figure 11:
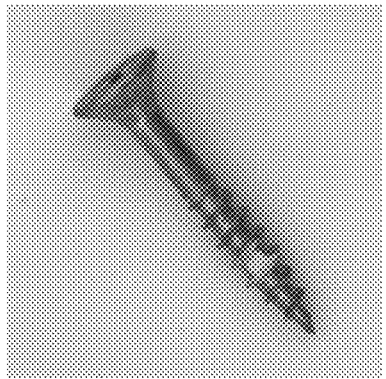
Figure 11:
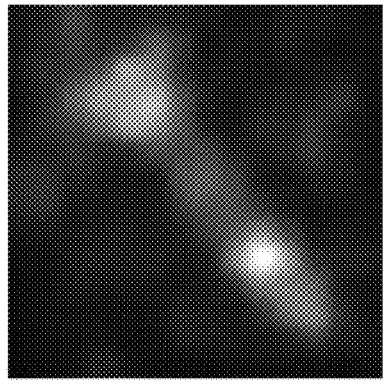

In some embodiments, the present disclosure provides for relaxing the rigid design of the spatial feature pyramid. It is noted that the context in CNNs is non-adaptive and is determined by the level of the pyramid. FIG. 11 shows an example of the effective contexts of CNNs and transformers, and the anomaly segmentation results on an anomalous image from MVTec Screw class. As can be seen, the effective context of the CNN is limited, while the actual attention pattern of the transformer is able to focus on the entire object. The anomaly segmentation of the transformer is significantly more similar to the ground truth than that of the CNN.

Although work has been presented previously on mitigating this issue, it has mostly not been widely adopted due to the deviance from the main design principles of CNNs. CNN features that are reliant on the context may not find a good similarity correspondence, as random background patterns may not repeat between the training and the test sets. Instead, the present disclosure provides for using Vision Transformers (ViT) for anomaly detection. In this architecture, each pixel may gain its context from across the entire image on the one hand, but tends to focus only on context features that are deemed relevant according to the attention layers. The attention layers in each transformer unit, allow the network to learn to avoid including irrelevant context and therefore outperform CNNs.

To overcome the limitation of the fixed context of CNNs, the present disclosure provides for using attention-based architectures. Vision Transformers were very recently proposed by Dosovitskiy et al. (see, Alexey Dosovitskiy, et al. An image is worth 16×16 words: Transformers for image recognition at scale. arXiv preprint arXiv:2010.11929, 2020.) Transformers consist of a set of multi-headed self-attention (MSA) layers and multi-layer perceptron (MLP) blocks. Each layer l first takes as input a representation f (where the layer superscript l of $f^l$ is dropped in the present notation for convenience) and linearly projects it to three representations: value $v \in \mathbb{R}^{P \times H \cdot N_d}$, key $k \in \mathbb{R}^{P \times H \cdot N_d}$ and query $q \in \mathbb{R}^{P \times H \cdot N_d}$, calculated for each patch p ($N_d$ is the representation dimension per head). Each of the representations v, k, q is then split long the channel dimension into H equal parts which are called attention heads ($v_h, k_h, q_h$). Each one of the attention heads calculates an attention map $A_h \in \mathbb{R}^{P \times P}$, using an inner product between its query and the keys of all patches. The attention map is normalized by the square root of the number of attention heads H:

$$A_h = \text{softmax}\left(\frac{q_h k_h^T}{\sqrt{H}}\right) \quad (13)$$

The multihead self-attention layer concatenates the per-head attention maps $A_h$ multiplied by the per-head values $v_h$, and projects it to the representation dimension using matrix U:

$$\text{MSA}(f) = [A_1 v_1, \ldots, A_h v_h, \ldots, A_H v_H] U \quad (14)$$

The patches are initialized using trainable linear projection E of the input image x (split into P patches, patch p is denoted $x_p$) together with an embedding representing the image position $E_{pos}$:

$$f^0 = [x_{class}, x_1 E, x_2 E \ldots x_P E] + E_{pos} \quad (15)$$

The $x_{class}$ dimension (called the "token"), is initialized with zeros, and eventually used (at the last layer) as the final features for classification in pretraining. At each transformer layer l, the representation $f^{l-1}$ is normalized using layer norm, and then updated in a residual fashion using MSA (i.e. $f^l = f^{l-1} + MSA(f^{l-1})$). It is then normalized again and updated with a residual MLP block $f^l = f^l + MLP(f^l)$, to achieve the next layer's representation $f^l$.

In the transformer architecture described above, all layers may potentially have all the input pixels as their context. Nevertheless, early layers learn to use relatively well localized context, while later layers learn higher level features, which require a wide context. Therefore, the activation of the 6th layer may be selected, which incorporates a sufficient amount of context while still retaining locality, yielding strong anomaly segmentation performance. Moreover, the attention maps tend to choose semantically meaningful contexts (FIG. 11), such as the object in which an anomaly may occur, rather than random background or boundary elements.

ViT operates on input grids of size 14×14 or 16×16. This severely limits the resolution of the obtainable segmentation. In order to scale-up the resolution of the segmentation, the present disclosure provides for a multi-scale transformer. In this variant, pixel-level anomaly scores are extracted using the same transformer representation twice: once when applying the network and similarity estimation on the entire image $\phi_{r1}$, and again by splitting the image to four quarters, and applying the same method for each quarter $\phi_{r2}$. The patch is scored using features extracted from each of the resolutions. The sum of the scores from each resolutions is taken as the total score for the high-resolution patch.

Experimental Results

The present disclosure was quantitatively evaluated on the MVTec dataset, which is the main dataset used by most methods to evaluate anomaly segmentation performance. It simulates industrial fault detection where the objective is to detect parts of images of products that contain faults such e.g. dents, missing parts, misalignment or unexpected textures. Each of the 15 classes contains a training set of normal images, normal test images and images of faults of different types as anomalies. The present disclosure was also evaluated on the CUB200 dataset, using two categories of Woodpecker—the normal training image have a breed that does not have a red dot on the head, while the anomalous images do. Similarly, examples are presented on the Oxford Flowers 101 dataset, wherein normal flowers do not have insects on them, while anomalous images do.

The present method is compared against a large set of known methods. Each method scores each of the pixels of the test image as normal or anomalous. The previous methods include: classical anomaly detection methods (1-NN, OCSVM), autoencoders with $L_2$ and SSIM losses ($AE_{l_2}$ and $AE_{SSIM}$), variational autoencoders with reconstruction loss and GRAD-CAM (VAE, GAVGA), texture distributional models (TI), shape-based matching (VM), K-means of deep features from context-less patches (CNN-Dict), GAN-based (AnoGAN), and student-teacher regression of pre-trained features (Student).

To evaluate the quality of segmentation, different evaluation metrics were proposed in the literature. As some baselines reported pixel ROCAUC while others reported PRO (and some reported both), the present disclosure compares each method on the metric that it reported. Pixel ROCAUC computes the area under the ROC curve for the pixel-segmentation accuracy. The other metric is PRO, which gives equal weighting to all the connected components of the ground truth anomaly segmentation. It integrates over different pixel-wise false positive ratios (between 0 to 0.3), and takes the cover ratio of each anomaly—averaged on all the individual anomalies in the test set (different connected components are deemed as different anomalies). In cases where the test images contain small anomalies, as well as very big ones, ROCAUC can be dominated by the big anomalies (containing many pixels) while neglecting the small ones. PRO on the other hand will give all anomalies an equal weight.

In some embodiments, the experimental architectures used by the present disclosure comprises BiT-M-R50x1 ResNet and ViT-Base, both pretrained on ImageNet-21 k.

Tables 19 and 20 below present the results of the baseline method. As can be seen, the use of pretrained convolutional features and simple kNN retrieval is enough to outperform all the existing methods on both anomaly detection metrics.

The results of the present transformer-based method are reported in in Tables 19, 20. It outperforms all other methods, including the simple CNN-based baseline method. All the pretrained models used by the present methods, including the ResNet BiT models, were trained based on ImageNet-21 k dataset. The ViT transformer architecture serves as a better anomaly segmentation feature extractor even when it is worse as a classifier (suggesting that the contextual patch description is the main factor here). Interestingly, it was often found that the present method was penalized for detecting, or failing to detect, anomalies where the ground truth was ambiguous to us.

TABLE 19

Anomaly segmentation accuracy on MVTec (ROCAUC %)

| | Baselines | | | | | | | The Present Method | |
| --- | --- | --- | --- | --- | --- | --- | --- | --- | --- |
| Class | TI | VM | AnoGAN | CNN Dict | $AE_{l_2}$ | $AE_{SSIM}$ | CAVGA-$R_u$ | Base | Multi-Scale Transformer |
| Carpet | 88 | — | 54 | 72 | 59 | 87 | — | 98.9 | 99.3 |
| Grid | 72 | — | 58 | 59 | 90 | 94 | — | 97.6 | 98.9 |
| Leather | 97 | — | 64 | 87 | 75 | 78 | — | 99.1 | 99.6 |
| Tile | 41 | — | 50 | 93 | 51 | 59 | — | 94.4 | 96.7 |
| Wood | 78 | — | 62 | 91 | 73 | 73 | — | 93.7 | 97.4 |
| Bottle | — | 82 | 86 | 78 | 86 | 93 | — | 98.1 | 98.8 |
| Cable | — | — | 78 | 79 | 86 | 82 | — | 96.4 | 97.7 |
| Capsule | — | 76 | 84 | 84 | 88 | 94 | — | 99.0 | 97.5 |
| Hazelnut | — | — | 87 | 72 | 95 | 97 | — | 97.4 | 99.1 |
| Metal nut | — | 60 | 76 | 82 | 86 | 89 | — | 98.6 | 98.0 |
| Pill | — | 83 | 87 | 68 | 85 | 91 | — | 96.4 | 96.8 |
| Screw | — | 94 | 80 | 87 | 96 | 96 | — | 99.2 | 99.1 |

TABLE 19-continued

Anomaly segmentation accuracy on MVTec (ROCAUC %)

| | | | Baselines | | | | | The Present Method | |
|---|---|---|---|---|---|---|---|---|---|
| Class | TI | VM | AnoGAN | CNN Dict | $AE_{\ell_2}$ | $AE_{SSIM}$ | CAVGA-$R_u$ | Base | Multi-Scale Transformer |
| Toothbrush | | 68 | 90 | 77 | 93 | 92 | — | 98.8 | 99.0 |
| Transistor | — | — | 80 | 66 | 86 | 90 | — | 94.2 | 95.5 |
| Zipper | — | — | 78 | 76 | 77 | 88 | — | 98.1 | 98.1 |
| Average | 75 | 77 | 74 | 78 | 82 | 87 | 89 | 97.3 | 98.1 |

TABLE 20

Anomaly segmentation accuracy on MVTec (PRO %)

| | | | Baselines | | | | | The Present Method | |
|---|---|---|---|---|---|---|---|---|---|
| Class | OC-SVM | 1-NN | VAE | CNN-Dict | $AE_{\ell_2}$ | $AE_{SSIM}$ | Student | Base | Multi-Scale Transformer |
| | 35.5 | 51.2 | 50.1 | 46.9 | 45.6 | 64.7 | 69.5 | 95.4 | 97.8 |
| Grid | 12.5 | 22.8 | 22.4 | 18.3 | 58.2 | 84.9 | 81.9 | 92.9 | 96.3 |
| Leather | 30.6 | 44.6 | 63.5 | 64.1 | 81.9 | 56.1 | 81.9 | 98.1 | 99.0 |
| Tile | 72.2 | 82.2 | 87.0 | 79.7 | 89.7 | 17.5 | 91.2 | 85.7 | 92.5 |
| Wood | 33.6 | 50.2 | 62.8 | 62.1 | 72.7 | 60.5 | 72.5 | 91.1 | 96.1 |
| Bottle | 85.0 | 89.8 | 89.7 | 74.2 | 91.0 | 83.4 | 91.8 | 94.7 | 96.4 |
| Cable | 43.1 | 80.6 | 65.4 | 55.8 | 82.5 | 47.8 | 86.5 | 86.1 | 91.1 |
| Capsule | 55.4 | 63.1 | 52.6 | 30.6 | 86.2 | 86.0 | 91.6 | 94.4 | 91.3 |
| Hazelnut | 61.6 | 86.1 | 87.8 | 84.4 | 91.7 | 91.6 | 93.7 | 93.1 | 96.4 |
| Metal nut | 31.9 | 70.5 | 57.6 | 35.8 | 83.0 | 60.3 | 89.5 | 94.1 | 95.5 |
| Pill | 54.4 | 72.5 | 76.9 | 46.0 | 89.3 | 83.0 | 93.5 | 95.4 | 95.6 |
| Screw | 64.4 | 60.4 | 55.9 | 27.7 | 75.4 | 88.7 | 92.8 | 96.2 | 95.3 |
| Toothbrush | 53.8 | 67.5 | 69.3 | 15.1 | 82.2 | 78.4 | 86.3 | 91.5 | 93.0 |
| Transistor | 49.6 | 68.0 | 62.6 | 62.8 | 72.8 | 72.5 | 70.1 | 85.6 | 85.4 |
| Zipper | 35.5 | 51.2 | 54.9 | 70.3 | 83.9 | 66.5 | 93.3 | 94.4 | 94.5 |
| Average | 47.9 | 64 | 63.9 | 51.5 | 79 | 69.4 | 85.7 | 92.6 | 94.4 |

Multiple ablations of the present method are reported in Table 21 below. The full method uses multi-scale transformer with kNN retrieval and achieves the best results. Replacing the base kNN retrieval by K-means with 2000 centroids was also evaluated, wherein while K-means results in a significant retrieval runtime and storage savings (particularly for very large datasets), it has only a minor impact on performance. The present multi-resolution transformer was also compared against the standard ViT without the addition of the higher resolution transformer (so only the 14×14 features map output by the 6th layer—denoted 'ViT 14×14'). It is clear that the multi-resolution formulation is essential for the strong performance.

Another CNN multi-scale feature combination approach was evaluated, wherein the features from all levels were concatenated to achieve a Single Feature Pyramid: $f_p^{pyramid} = (f_p^1, f_p^2 \ldots f_p^L)$. Each pixel p is then scored using score=$d(f_p^{pyramid})$. As can be seen, the accuracy is quite similar between the two CNN-based approaches (97.3% vs. 97.2%) with a slight advantages to the approach of combining scores rather than features.

It was further found that a Wide ResNet50_3 CNN trained on ImageNet1 k achieved very similar results to the base CNN, and yielded PRO of 92.5 (vs. 92.6 for ImageNet-21 k). The largest ImageNet-21 k pretrained architectures that was run (BiT-M-101x3) still unperformed ViT with PRO of 93.4, while being much larger than our transformer and being much slower (using larger transformer architectures is very likely to improve results).

Finally, the CNN approach was evaluated with the same multi-scale method used by the transformer (combining features from the full image and the 4 quarters), but it gave worse results than the multi-scale transformer method or any other convolutional method.

TABLE 21

Ablation on MVTec (avg. ROCAUC %)

| Ablation | K-means | ViT 14 × 14 | SFP (CNN) | Present Method |
|---|---|---|---|---|
| ROC | 98.0 | 97.2 | 97.2 | 98.1 |
| PRO | 94.0 | 90.7 | 92.6 | 94.4 |

Figure 12:
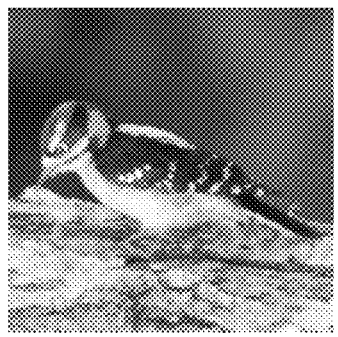
FIG. 12 shows the attention maps of ViT drawn for the 2, 6 and 10 layers (left to right), for illustration, according to some embodiments of the present disclosure.
Figure 12:
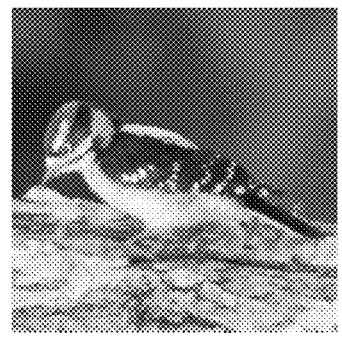
Figure 12:
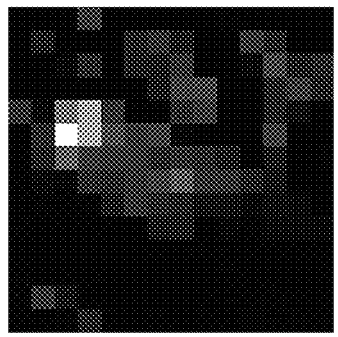
Figure 12:
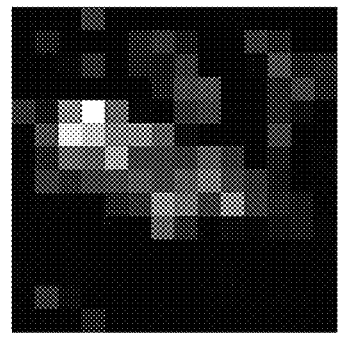
Figure 12:
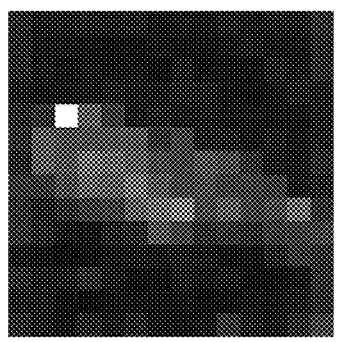
Figure 12:
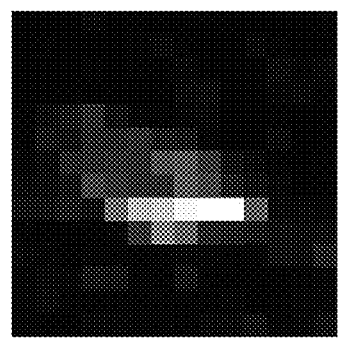
Figure 12:
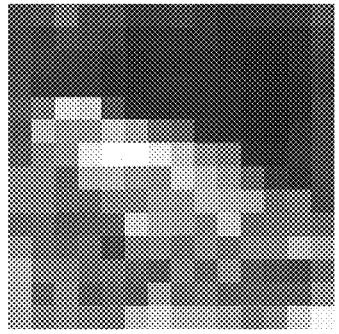
Figure 12:
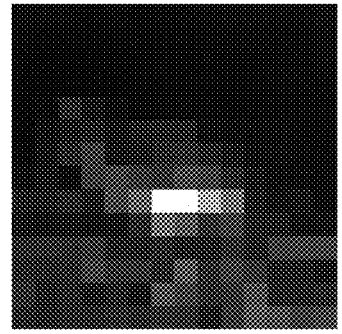

In some embodiments, the present disclosure used transformer-based architectures to capture relevant context, while avoiding irrelevant context. FIG. 12 shows the attention maps of ViT drawn for the 2, 6 and 10 layers (left to right), for illustration. The rightmost image is the input to the network. The attention map to the classification token is shown in the top row, and the attention map to the center pixel is shown on the bottom row. As can be seen, most attention is paid to the bird rather than the background. Deeper layers pay most attention to the remarkable dot on the head of the bird. For the patch of interest, first, attention maps are calculated for each attention head as explained above. Then, the attention is averaged across the different attention heads, and plotted after normalizing to a grey-scale map between 0 to 255. The attention maps of the classification token of low level layers are able to identify the outline of the inspected object while refraining from including much of the background area. The higher layer attention maps tend to lose their localization properties, as each patch already incorporates information from many other patches. The attention maps of the center pixel show results that are quite similar. The center pixel incorporates more information from the representations of its previous layers, and its neighboring patches.

The performance of the present transformer-based approach for anomaly detection was tested at the level of the entire image. It was found that in this case, the performance of the transformer features is lower than that of the CNN-based method (87.8% vs. 85.4% ROCAUC averaged over all classes of MVTec). This demonstrates that the stronger performance of transformers on anomaly segmentation is not due to transformers having stronger features. Another supporting fact is when trained on ImageNet21 k (rather than the non-public JFT300M), ViT achieves lower object classification accuracy than the CNN. Instead, the better performance on anomaly segmentation is due to the better patch contextual embedding.

Figure 13:
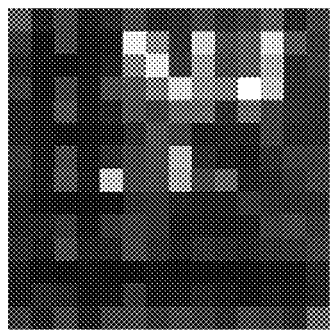
FIG. 13 illustrates (left to right) original input image and its 6th layer ViT attention maps (normalized) for normal and anomalous images, according to some embodiments of the present disclosure.
Figure 13:
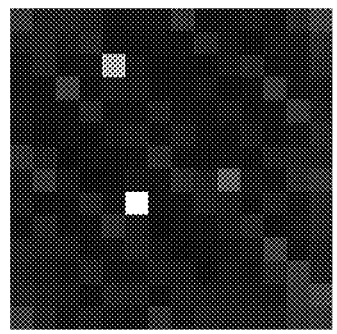
Figure 13:
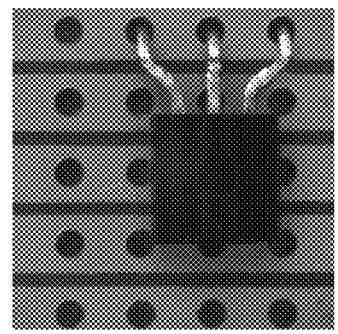
Figure 13:
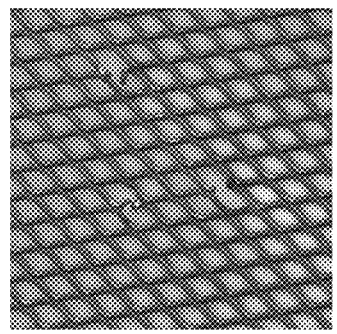
Figure 13:
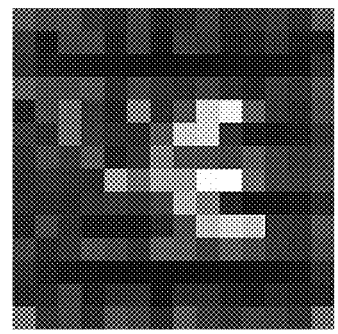
Figure 13:
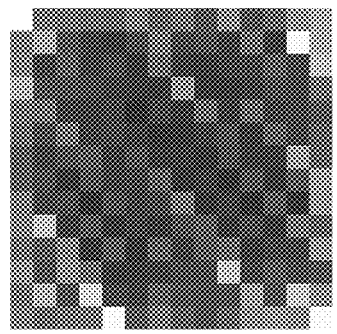
Figure 13:
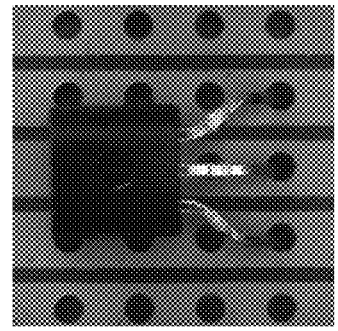
Figure 13:
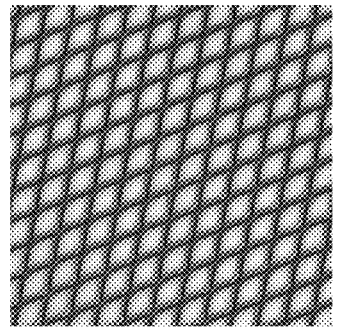

FIG. 13 illustrates (left to right) original input image and its 6th layer ViT attention maps (normalized) for normal and anomalous images. the top row shows results with no training set, wherein both transistor rotations can be considered normal, and the attention map cannot determine which transistor is anomalous. The bottom row shows pixels that contain anomalies and attract much more attention than their neighboring pixels and suggest where the anomalies are located. Inspection of the attention patterns of transformers in FIG. 13 illustrates an intriguing phenomenon. The transformer often pays disproportionate attention to image regions that contain anomalies. This provides some explanation for why the learned context is useful for anomaly segmentation, it highlights the parts of the context the provide evidence that a certain image region is anomalous.

This phenomenon can be used in a profitable way for a new task, zero-shot anomaly segmentation. The objective of the task is to detect the parts of the image that contain anomalies, just based on a single image and without being given other examples (normal or anomalous) from the same class. The ability to segment anomalies based on a single image is based on the pretraining properties of the networks. Specifically, the anomaly segmentation score is computed by computing the attention from the classification token to each of the patches at layer l (e.g., l=6). As each head has a different attention pattern, the result is averaged over the attention of all heads. While it cannot be expected to segment some anomalies, such as the misaligned transistor (see FIG. 13 top row), as it is hard to define the normal alignment without a normal training set, other types of anomalies are well located (see FIG. 13 bottom row). The accuracy of zero-shot anomaly segmentation is evaluated quantitatively in Table 22 below. As can be seen, the present method obtains non-trivial segmentation accuracy of >70% pixel-ROCAUC. It is also compared to the baseline of the kNN distance between the feature representation of the patch and its nearest neighbor. As can be seen, the attention-based approach outperforms the internal kNN baseline.

TABLE 22

| Accuracy for Zero Shot Anomaly Segmentation (avg. ROCAUC %) | | | | | | | | |
|---|---|---|---|---|---|---|---|---|
| Class | Carpet | Grid | Leather | Tile | Wood | Bottle | Cable | Capsule |
| Internal kNN | 87.9 | 84.3 | 91.2 | 61.0 | 80.2 | 82.4 | 64.1 | 72.6 |
| Attention | 95.8 | 86.8 | 98.9 | 91.7 | 86.9 | 87.6 | 78.8 | 91.4 |
| Class | Hazelnut | Metal nut | Pill | Screw | Toothbrush | Transitioner | Zipper | Average |
| Internal kNN | 94.9 | 67.0 | 78.4 | 91.5 | 90.9 | 57.4 | 80.5 | 79.0 |
| Attention | 94.8 | 74.7 | 78.3 | 93.9 | 89.6 | 71.3 | 95.3 | 87.7 |

It was further evaluated whether the attention-based method can be used for zero-shot image-level anomaly detection, where the objective is to determine if an image is anomalous given just a single image and no training set of images from a similar class. A simple approach was tested of taking the maximum over the attention map averaged over all heads. The hypothesis is that anomalous images will have a larger maximal attention value than normal images. The method was evaluated over the MVTec dataset (Table 23 below). It was found that this works quite well on textures where repetitions provide evidence for normal patterns and deviation from the repetitions indicates anomalous regions (the exception is Grid, probably because the scale of repetitions is larger than the patch size). It also works very well on objects where the anomaly is a texture, e.g., Hazelnut and Bottle. In some other classes, e.g., Transistor, it is hard to infer anomalies without training images. it may also be seen that the attention-map-based method outperforms the internal kNN baseline. While those results are of course weaker than the standard setting where normal-only training images are available, they illustrate the strength of the transformer-based approach for zero-shot anomaly detection.

TABLE 23

Accuracy for Zero Shot Anomaly Detection (avg. ROCAUC %)

| Class | Carpet | Grid | Leather | Tile | Wood | Bottle | Cable | Capsule |
|---|---|---|---|---|---|---|---|---|
| Internal kNN | 66.2 | 50.6 | 72.1 | 77.1 | 86.1 | 54.1 | 47.1 | 64.9 |
| Attention | 94.0 | 56.2 | 100.0 | 96.4 | 97.7 | 76.7 | 47.5 | 72.6 |
| Class | Hazelnut | Metal nut | Pill | Screw | Toothbrush | Transitioner | Zipper | Average |
| Internal kNN | 72.0 | 49.8 | 58.0 | 59.8 | 79.2 | 70.3 | 63.0 | 64.7 |
| Attention | 86.5 | 50.0 | 48.4 | 51.7 | 56.7 | 59.5 | 84.3 | 72.2 |

In some embodiments, the present disclosure provides for results wherein the pixel-level ROCAUC may be higher than the image-level ROCAUC. For example, if only half of the images contain very small anomalies—of the size of one pixel each. In each image, a single pixel is scored with the score s=1, the anomalous pixel if exists, and a random pixel otherwise. This kind of algorithm can achieve near-perfect pixel-level ROC and PRO (as it finds all the anomalous pixels with very low false positive ratio) but without being informative on whether the image is anomalous. Typically, anomalies are indeed very small, and therefore this scenario is quite common.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
at least one hardware processor; and
a non-transitory computer-readable storage medium having stored thereon program instruction, the program instructions executable by the at least one hardware processor to:
  receive, as input, training images, wherein at least a majority of said training images represent normal data instances,
  receive, as input, a target image,
  extract (i) a set of feature representations from a plurality of sub-image locations within each of said training images, and (ii) target feature representations from a plurality of target sub-image locations within said target image,
  calculate, with respect to a target sub-image location of said plurality of target sub-image locations in said target image, a distance between (iii) said target feature representation of said target sub-image location, and (iv) a subset from said set of feature representations comprising the k nearest said feature representations to said target feature representation, and
  determine that said target sub-image location is anomalous, when said calculated distance exceeds a predetermined threshold.

2. The system of claim 1, wherein said program instructions are further executable to perform said calculating and said determining with respect to all of said plurality of target sub-image locations.

3. The system of claim 2, wherein said program instructions are further executable to designate a segment of said target image as comprising anomalous target sub-image locations, based, at least in part, on said determining.

4. The system of claim 1, wherein said program instructions are further executable to apply a clustering algorithm to said set of feature representations, to obtain clusters of said feature representations, wherein said calculating comprises calculating, with respect to a target sub-image location of said plurality of target sub-image locations, a distance between (i) said target feature representation of said target sub-image location, and (ii) the k nearest means of said clusters to said target feature representation.

5. The system of claim 1, wherein said extracting is performed by applying a pre-trained machine learning model to said training images and said target image, wherein said pre-trained machine learning model comprises a deep-learning neural network architecture comprising a feature pyramid having a plurality of layers, wherein each of said plurality of layers has a specified resolution, and wherein said extracting comprises concatenating features from two or more of said plurality of layers.

6. The system of claim 1, wherein said calculating comprises:
  (i) selecting, from said training images, a specified number n of nearest images to said target image; and
  (ii) calculating, with respect to a target sub-image location of said plurality of target sub-image locations in said target image, a distance between (a) said target feature representation of said target sub-image location, and (b) said feature representations from all of said sub-image locations in said n nearest images; and (iii) determining that said target sub-image location is anomalous, when said calculated distance exceeds a predetermined threshold.

7. The system of claim 1, wherein each of said sub-image locations represents one pixel in (i) each of said training images, and (ii) said target image.

8. A computer-implemented method comprising:
receiving, as input, training images, wherein at least a majority of said training images represent normal data instances;
receiving, as input, a target image;
extracting (i) a set of feature representations from a plurality of sub-image locations within each of said training images, and (ii) target feature representations from a plurality of target sub-image locations within said target image;
calculating, with respect to a target sub-image location of said plurality of target sub-image locations in said target image, a distance between (iii) said target feature representation of said target sub-image location, and (iv) a subset from said set of feature representations comprising the k nearest said feature representations to said target feature representation; and
determining that said target sub-image location is anomalous, when said calculated distance exceeds a predetermined threshold.

9. The computer-implemented method of claim 8, further comprising performing said calculating and said determining with respect to all of said plurality of target sub-image locations.

10. The computer-implemented method of claim 9, further comprising designating a segment of said target image as comprising anomalous target sub-image locations, based, at least in part, on said determining.

11. The computer-implemented method of claim 8, further comprising applying a clustering algorithm to said set of feature representations, to obtain clusters of said feature representations, wherein said calculating comprises calculating, with respect to a target sub-image location of said plurality of target sub-image locations, a distance between (i) said target feature representation of said target sub-image location, and (ii) the k nearest means of said clusters to said target feature representation.

12. The computer-implemented method of claim 8, wherein said extracting is performed by applying a pre-trained machine learning model to said training images and said target image, wherein said pre-trained machine learning model comprises a deep-learning neural network architecture comprising a feature pyramid having a plurality of layers, wherein each of said plurality of layers has a specified resolution, and wherein said extracting comprises concatenating features from two or more of said plurality of layers.

13. The computer-implemented method of claim 8, wherein said calculating comprises:
(i) selecting, from said training images, a specified number n of nearest images to said target image; and
(ii) calculating, with respect to a target sub-image location of said plurality of target sub-image locations in said target image, a distance between (a) said target feature representation of said target sub-image location, and (b) said feature representations from all of said sub-image locations in said n nearest images; and
(iii) determining that said target sub-image location is anomalous, when said calculated distance exceeds a predetermined threshold.

14. The computer-implemented method of claim 8, wherein each of said sub-image locations represents one pixel in (i) each of said training images, and (ii) said target image.

15. A computer program product comprising a non-transitory computer-readable storage medium having program instructions embodied therewith, the program instructions executable by at least one hardware processor to comprising:
receive, as input, training images, wherein at least a majority of said training images represent normal data instances;
receive, as input, a target image;
extract (i) a set of feature representations from a plurality of sub-image locations within each of said training images, and (ii) target feature representations from a plurality of target sub-image locations within said target image;
calculate, with respect to a target sub-image location of said plurality of target sub-image locations in said target image, a distance between (iii) said target feature representation of said target sub-image location, and (iv) a subset from said set of feature representations comprising the k nearest said feature representations to said target feature representation; and
determine that said target sub-image location is anomalous, when said calculated distance exceeds a predetermined threshold.

16. The computer program product of claim 15, wherein said program instructions are further executable to perform said calculating and said determining with respect to all of said plurality of target sub-image locations.

17. The computer program product of claim 16, wherein said program instructions are further executable to designate a segment of said target sub-image as comprising anomalous target image locations, based, at least in part, on said determining.

18. The computer program product of claim 15, wherein said program instructions are further executable to apply a clustering algorithm to said set of feature representations, to obtain clusters of said feature representations, wherein said calculating comprises calculating, with respect to a target sub-image location of said plurality of target sub-image locations, a distance between (i) said target feature representation of said target sub-image location, and (ii) the k nearest means of said clusters to said target feature representation.

19. The computer program product of claim 15, wherein said extracting is performed by applying a pre-trained machine learning model to said training images and said target image, wherein said pre-trained machine learning model comprises a deep-learning neural network architecture comprising a feature pyramid having a plurality of layers, wherein each of said plurality of layers has a specified resolution, and wherein said extracting comprises concatenating features from two or more of said plurality of layers.

20. The computer program product of claim 15, wherein said calculating comprises:
(i) selecting, from said training images, a specified number n of nearest images to said target image; and
(ii) calculating, with respect to a target sub-image location of said plurality of target sub-image locations in said target image, a distance between (a) said target feature representation of said target sub-image location, and (b) said feature representations from all of said sub-image locations in said n nearest images; and (iii) determining that said target sub-image location is anomalous, when said calculated distance exceeds a predetermined threshold.

\* \* \* \* \*